Oct. 25, 1960

C. Z. MONROE ET AL 2,957,289

MACHINE FOR FABRICATING CONTAINERS

Filed July 16, 1957

INVENTORS
CHARLES Z. MONROE
HARRY B. EGLESTON by: Carlson, Pitzner, Hubbard + Wolfe

ATTYS.

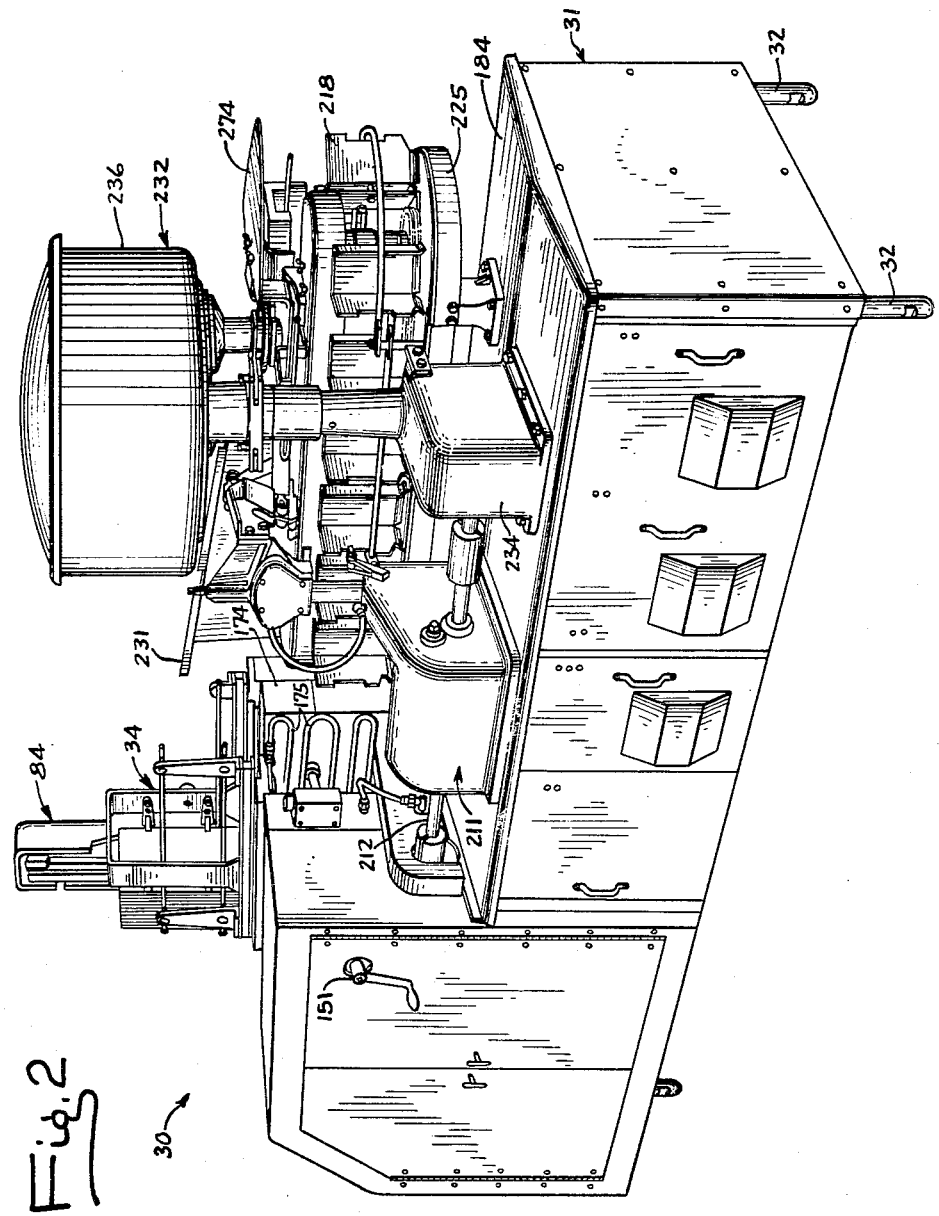

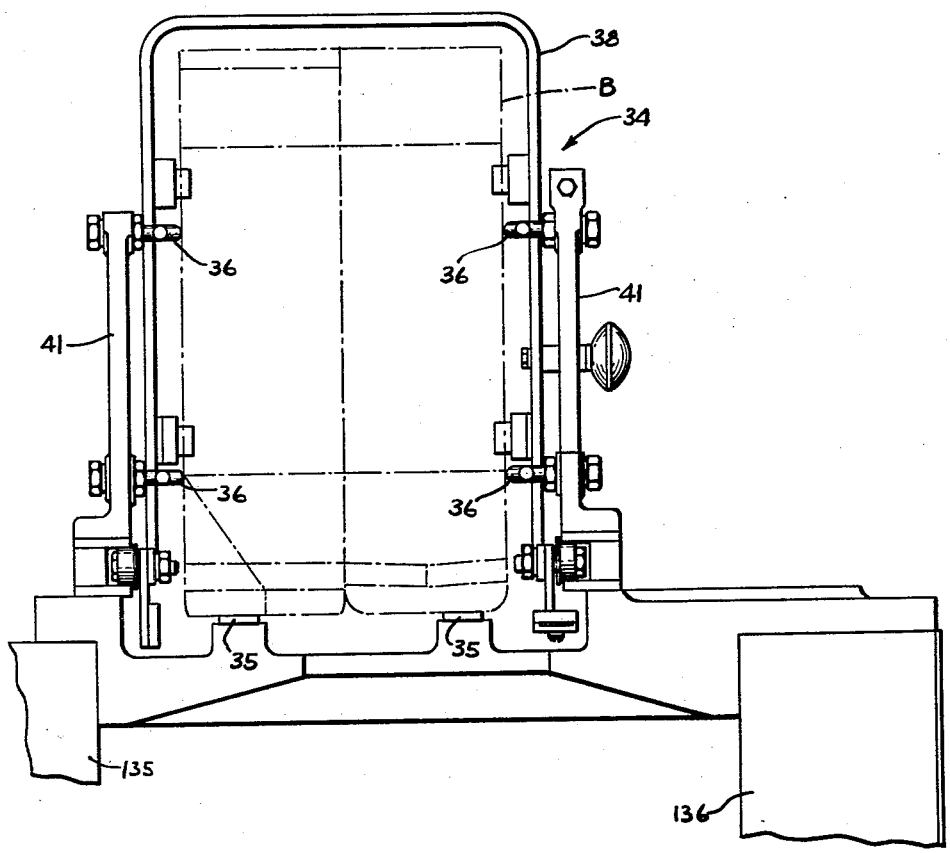
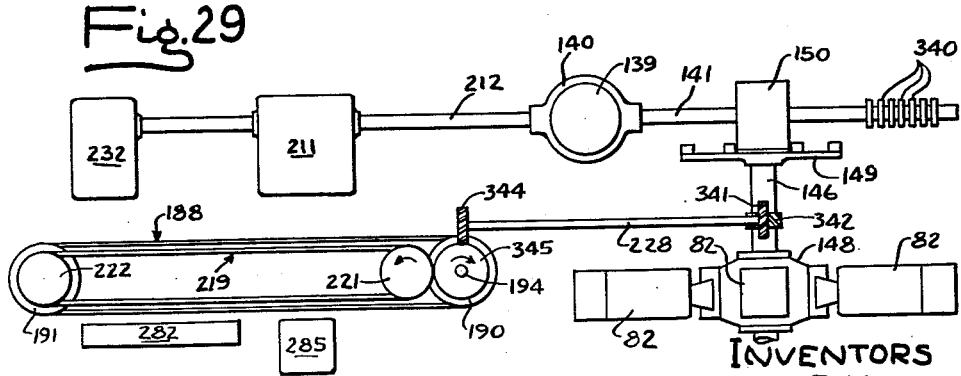

Oct. 25, 1960 C. Z. MONROE ET AL 2,957,289
MACHINE FOR FABRICATING CONTAINERS
Filed July 16, 1957 19 Sheets-Sheet 4
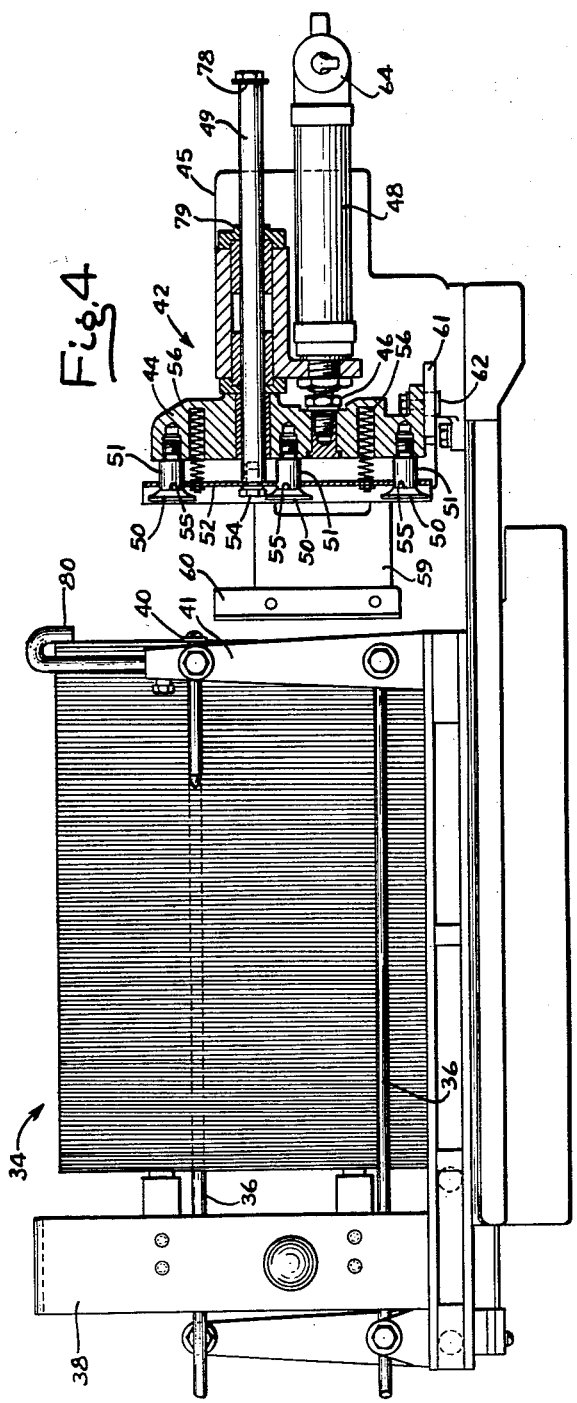
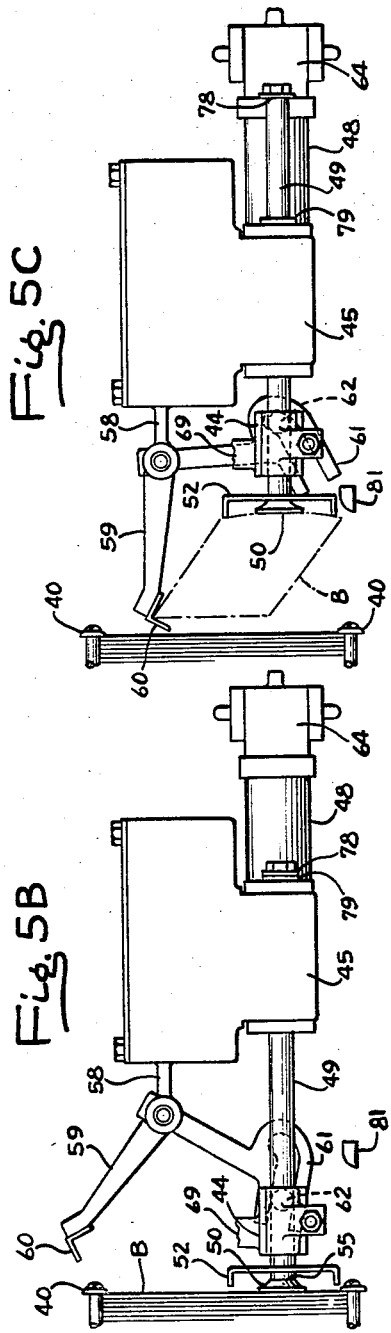
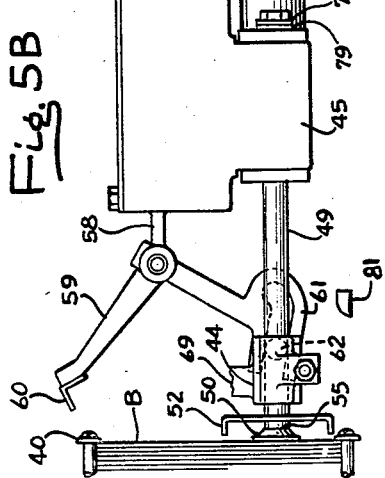
INVENTORS
CHARLES Z. MONROE
HARRY B. EGLESTON
by: Carlson, Pitzner, Hubbard + Wolfe
ATTYS.

Oct. 25, 1960
C. Z. MONROE ET AL
2,957,289
MACHINE FOR FABRICATING CONTAINERS
Filed July 16, 1957
19 Sheets-Sheet 5
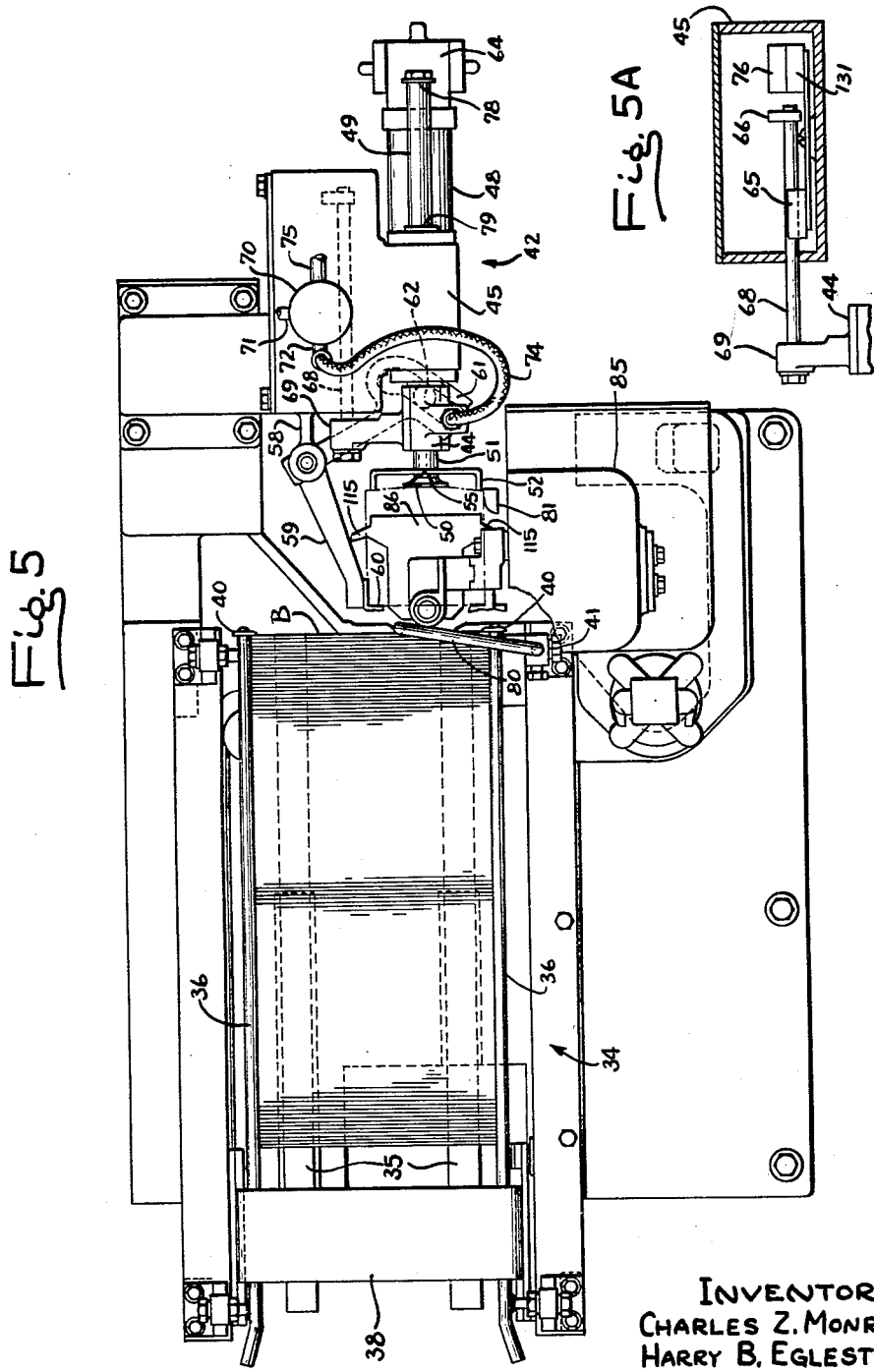
INVENTORS
CHARLES Z. MONROE
HARRY B. EGLESTON
by: Carlson, Pitzner, Hubbard + Wolfe
ATTYS.

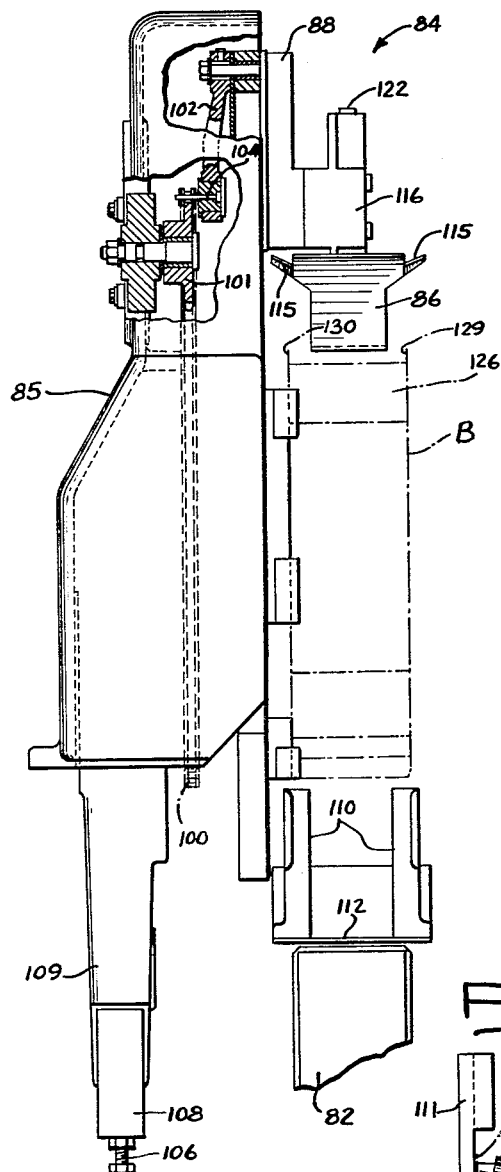
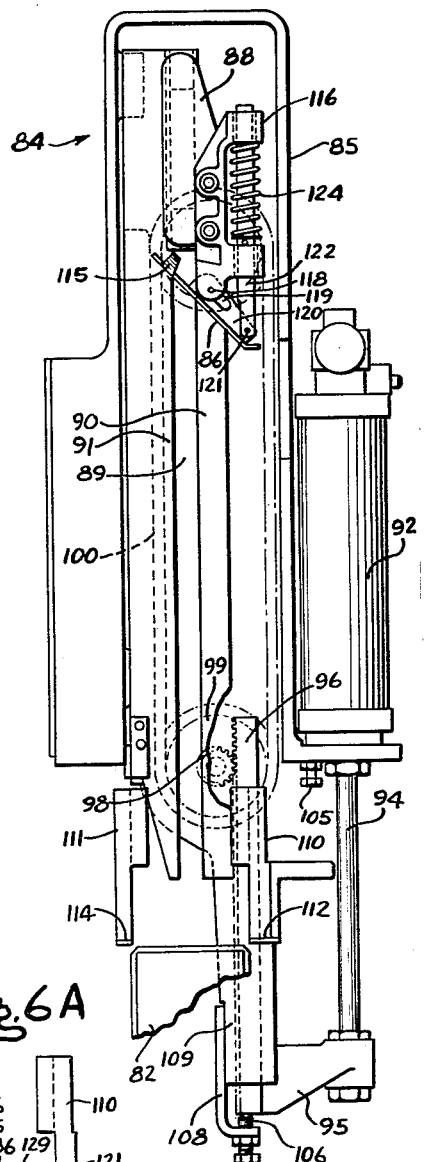

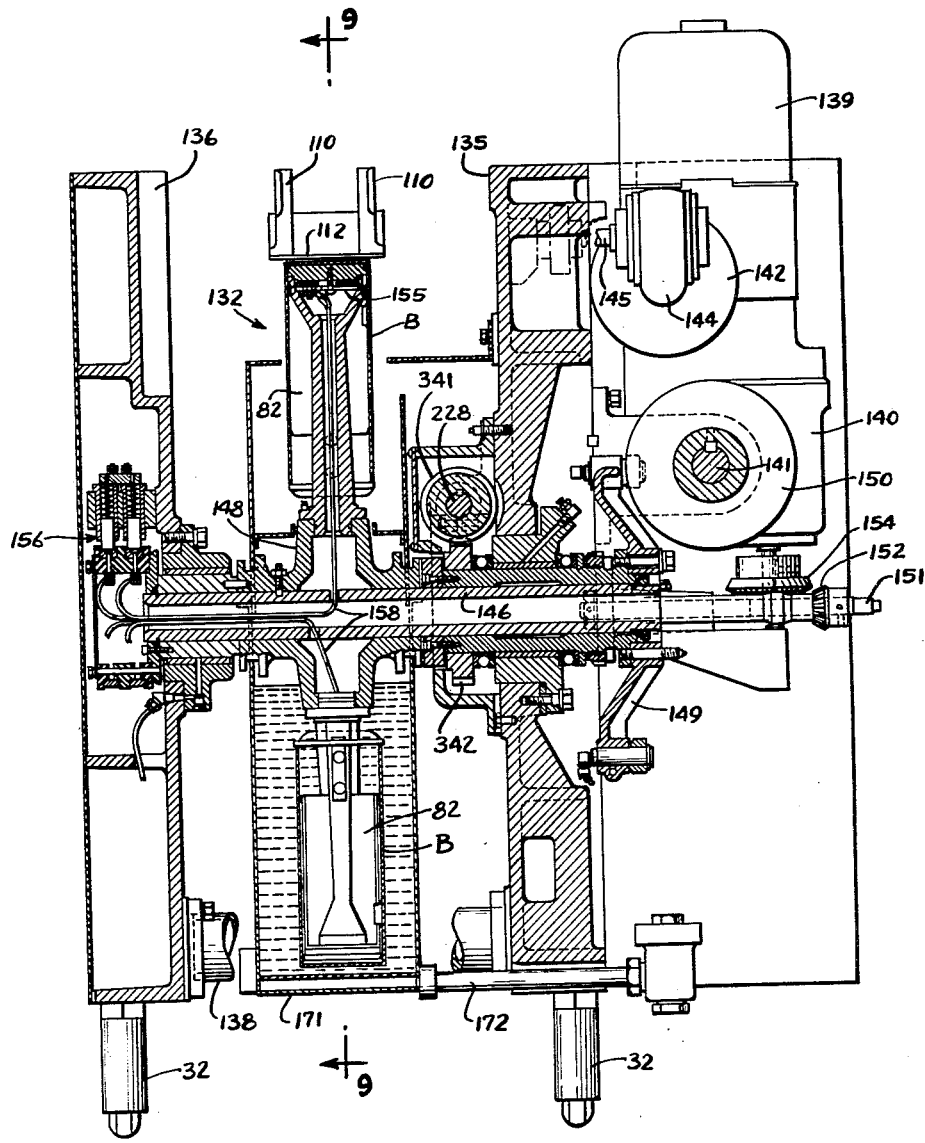

Oct. 25, 1960     C. Z. MONROE ET AL     2,957,289
MACHINE FOR FABRICATING CONTAINERS

Filed July 16, 1957     19 Sheets-Sheet 8

INVENTORS
CHARLES Z. MONROE
HARRY B. EGLESTON by: Carlson, Pitzner, Hubbard + Wolf
ATTYS.

Oct. 25, 1960 C. Z. MONROE ET AL 2,957,289
MACHINE FOR FABRICATING CONTAINERS
Filed July 16, 1957 19 Sheets-Sheet 9
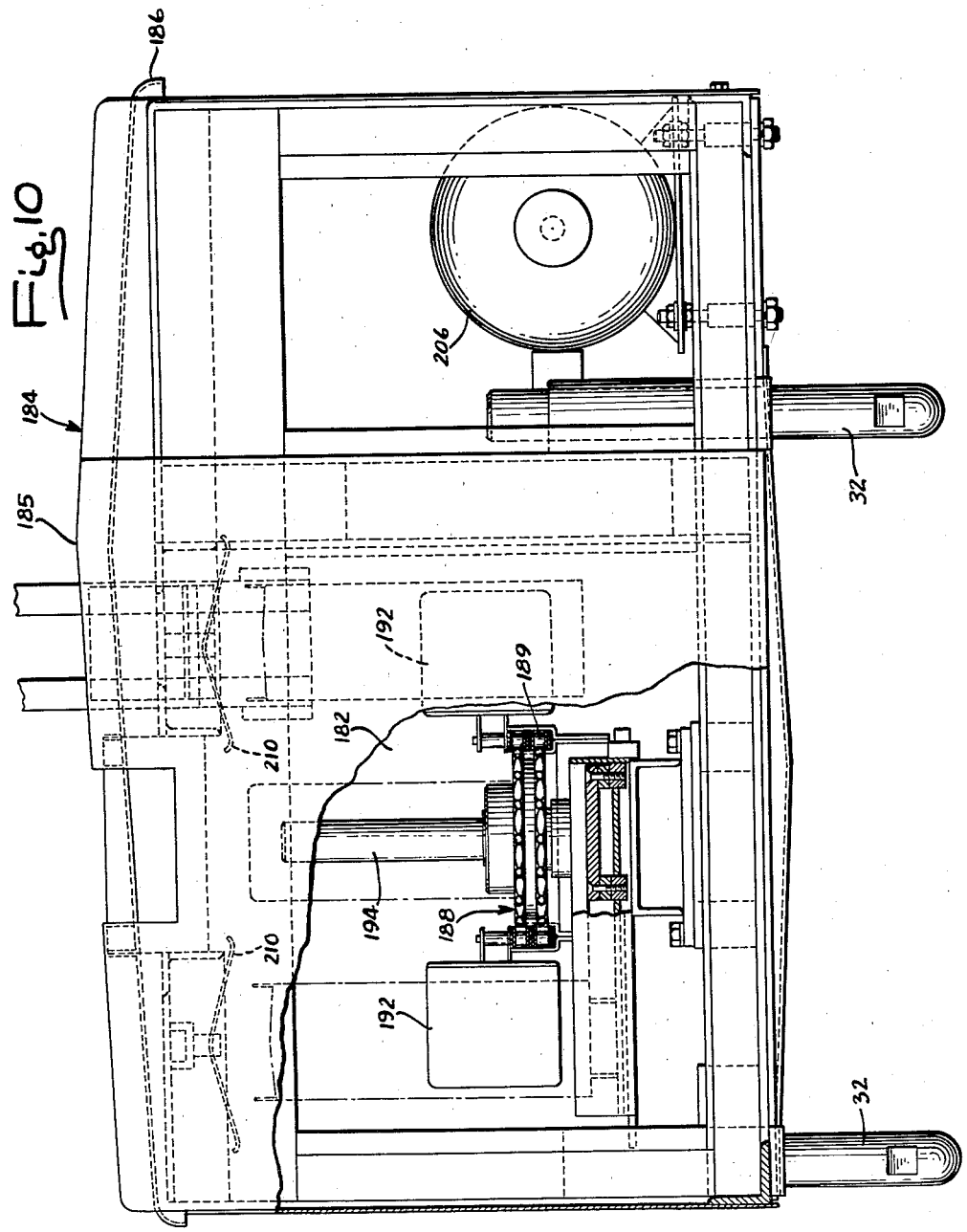
INVENTORS
CHARLES Z. MONROE
HARRY B. EGLESTON
by: Carlson, Pitzner, Hubbard + Wolfe
ATTYS.

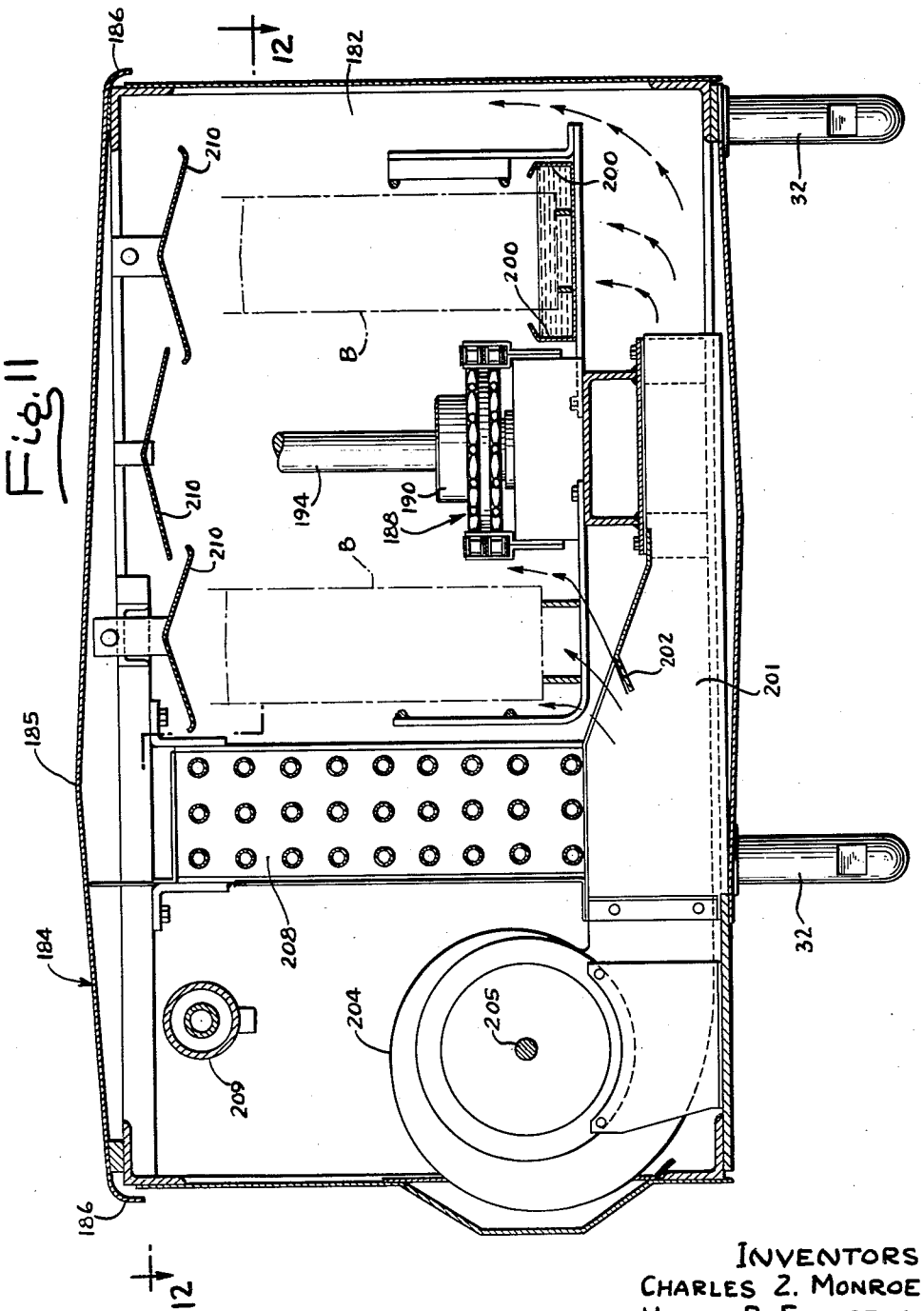

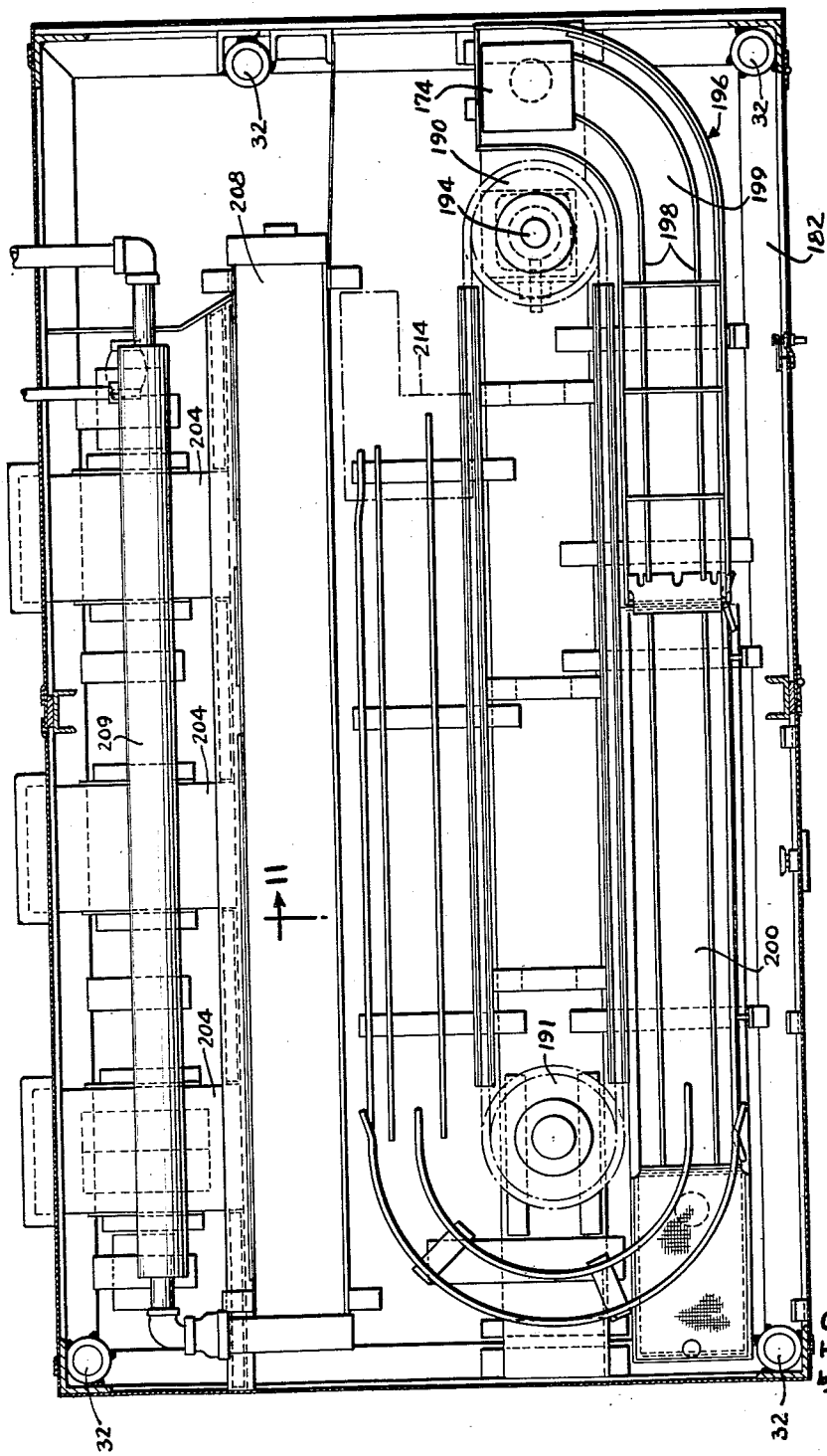

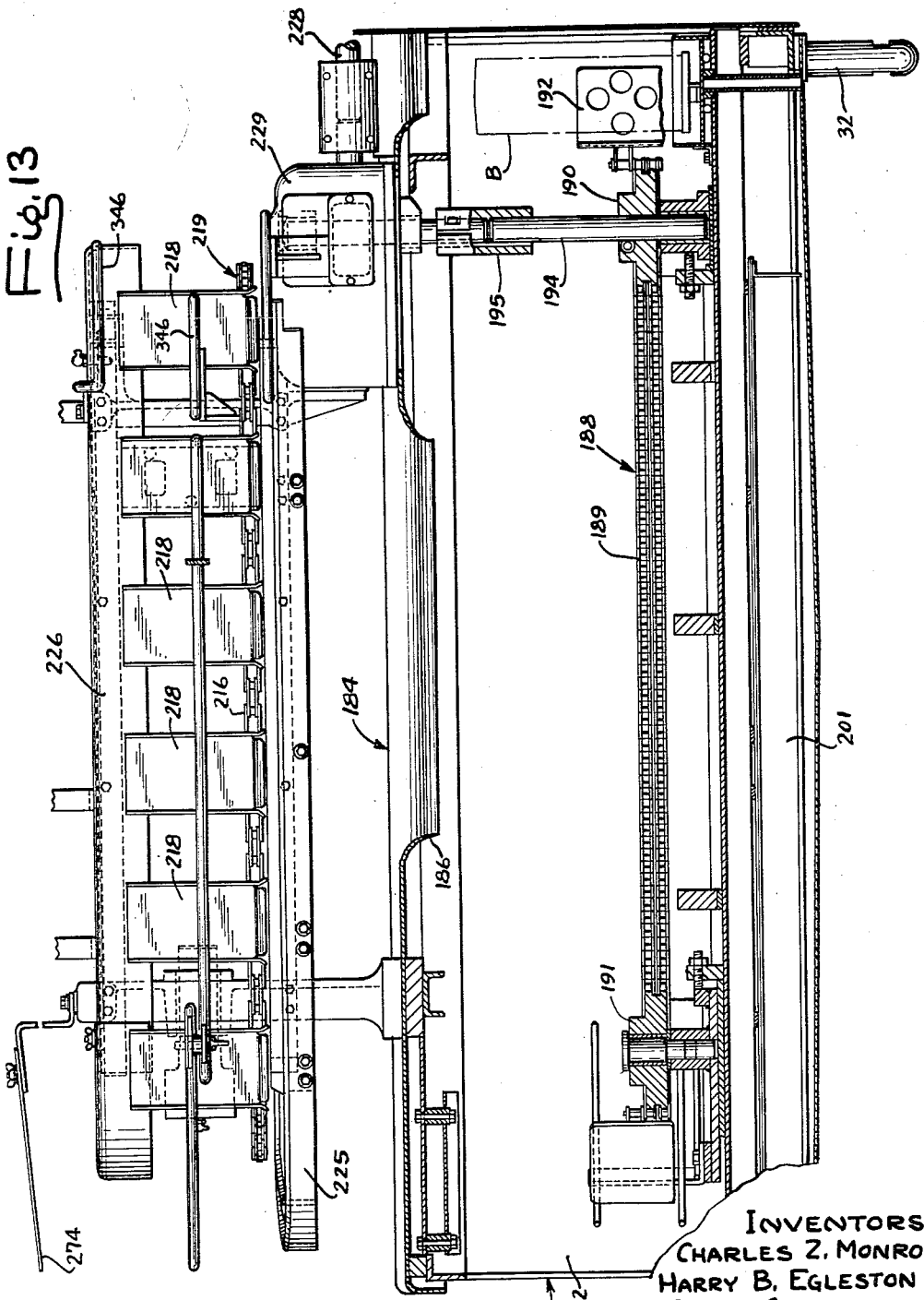

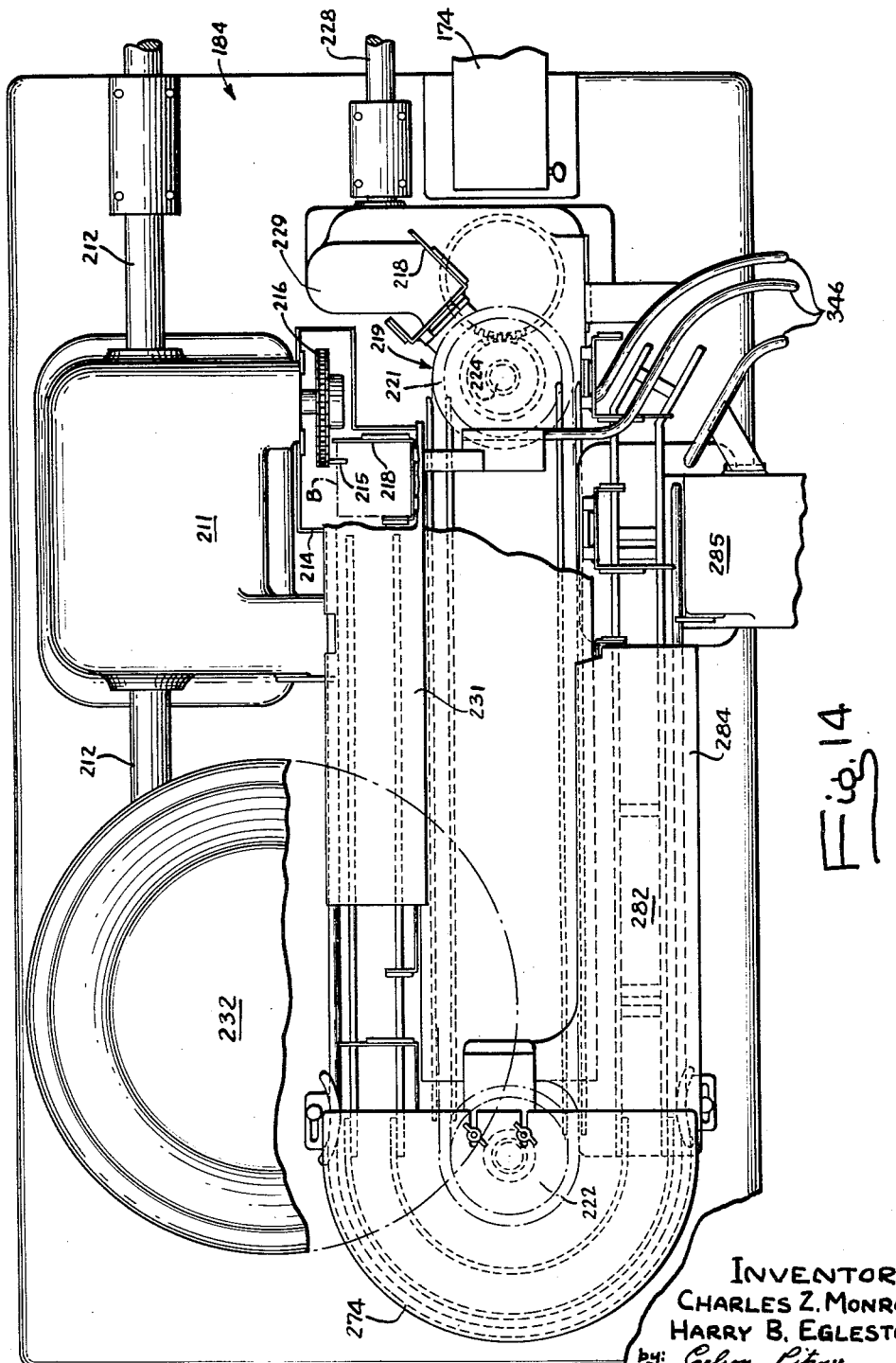

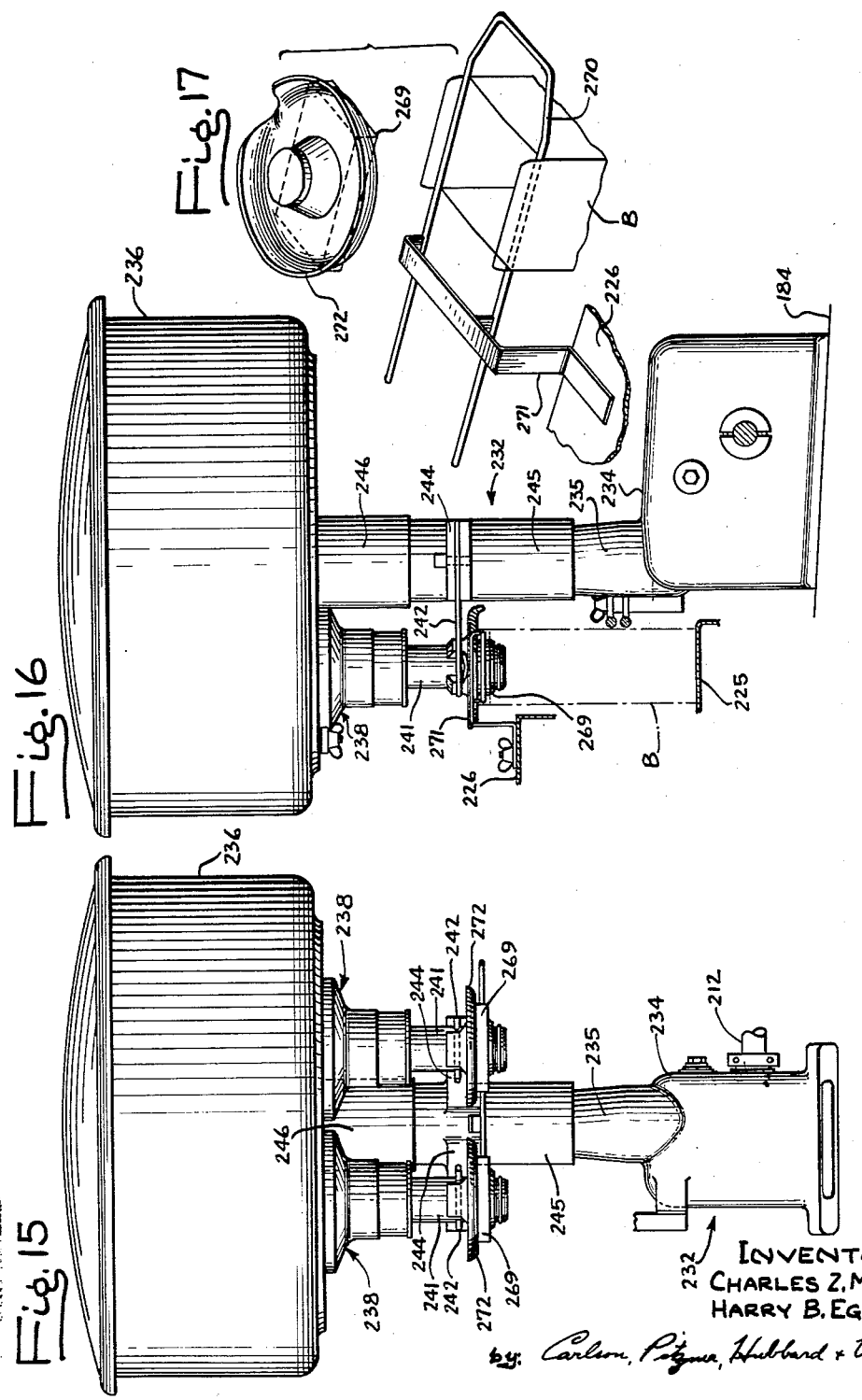

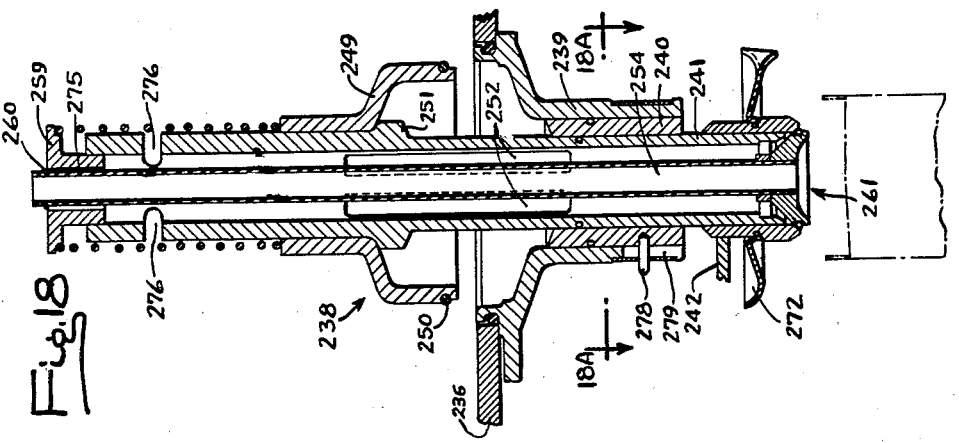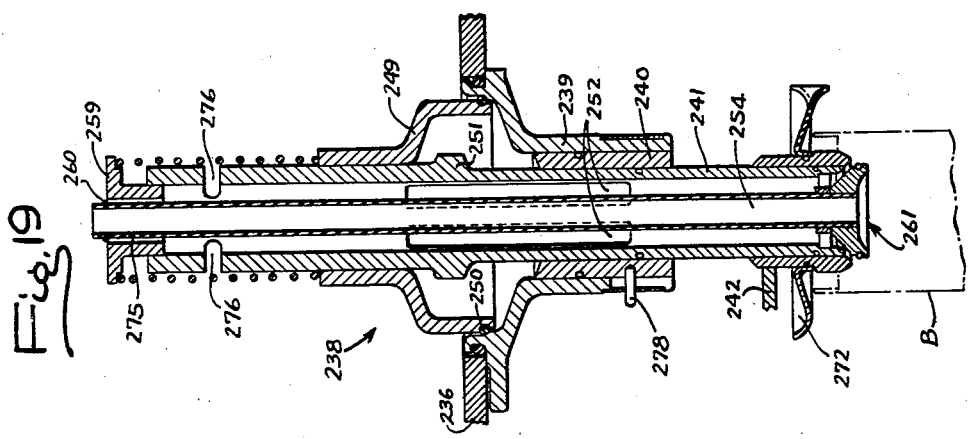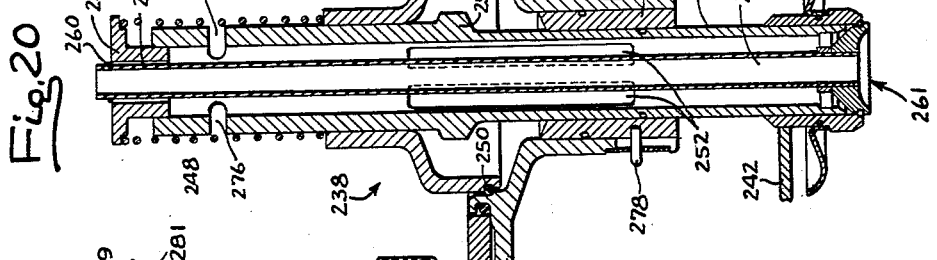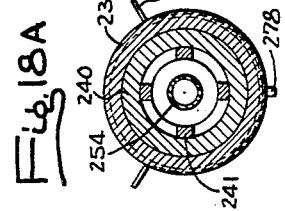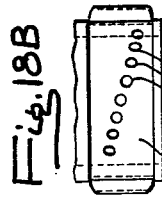

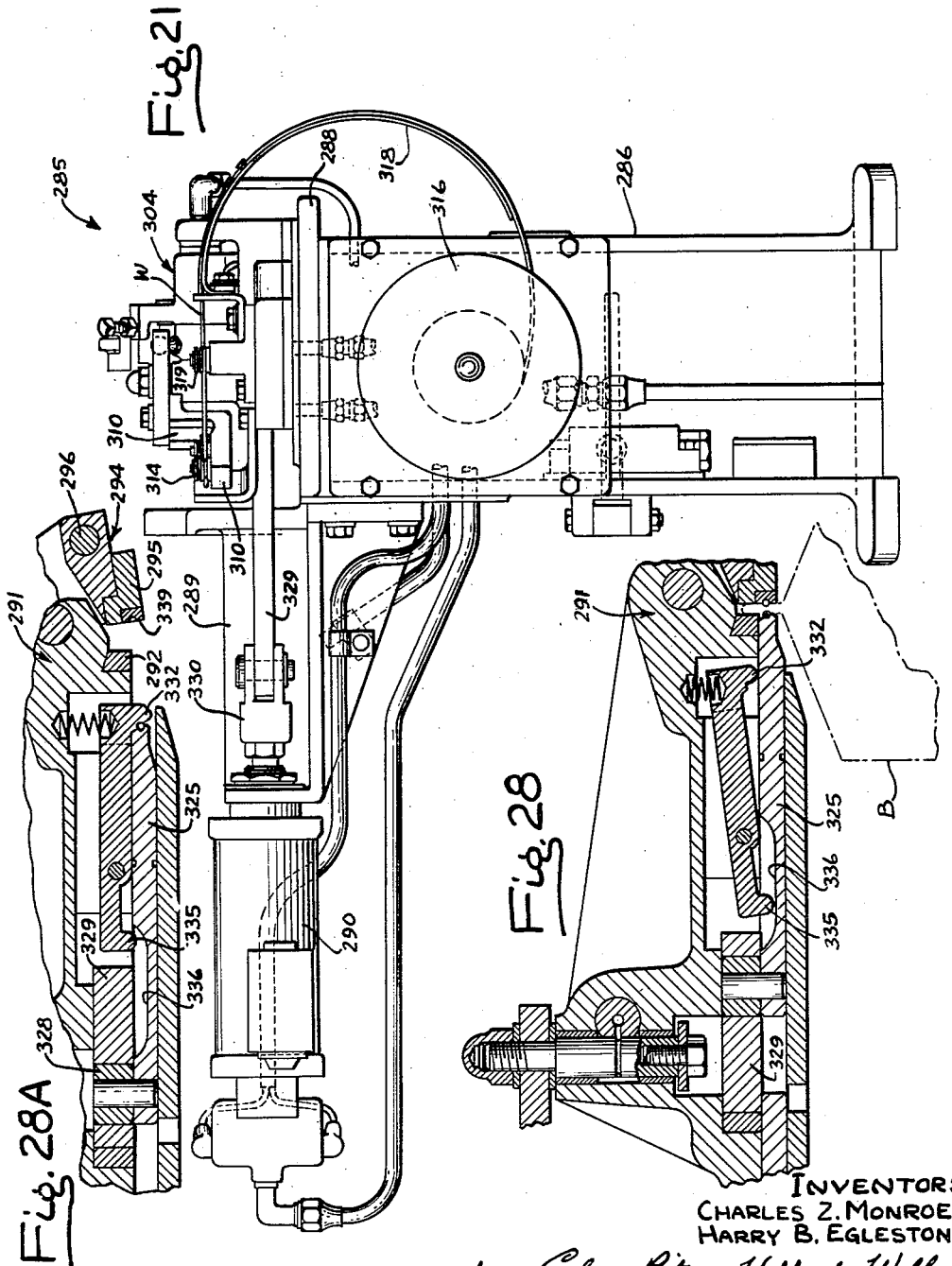

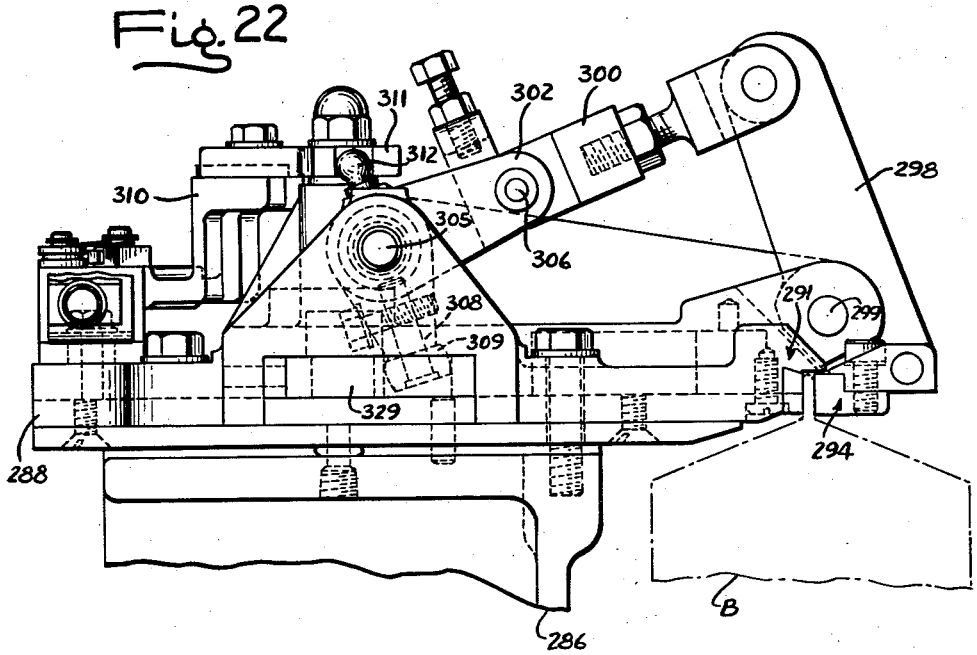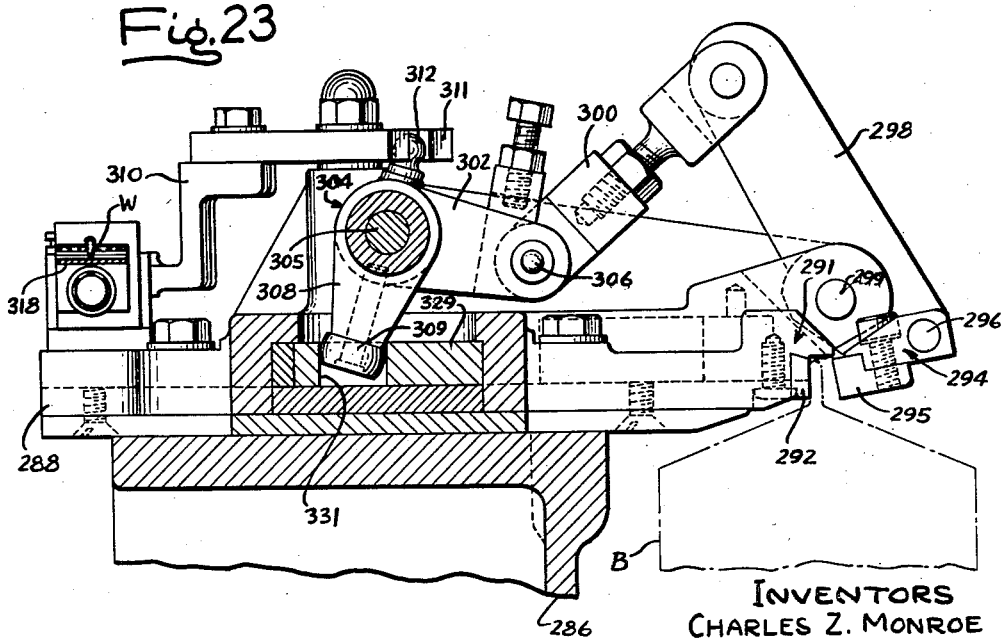

Oct. 25, 1960   C. Z. MONROE ET AL   2,957,289
MACHINE FOR FABRICATING CONTAINERS
Filed July 16, 1957   19 Sheets-Sheet 18
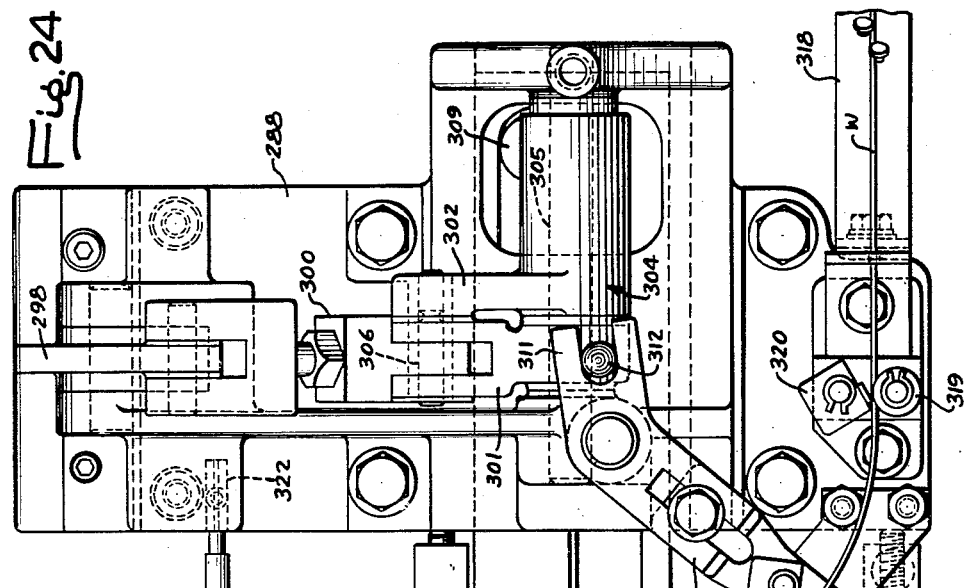
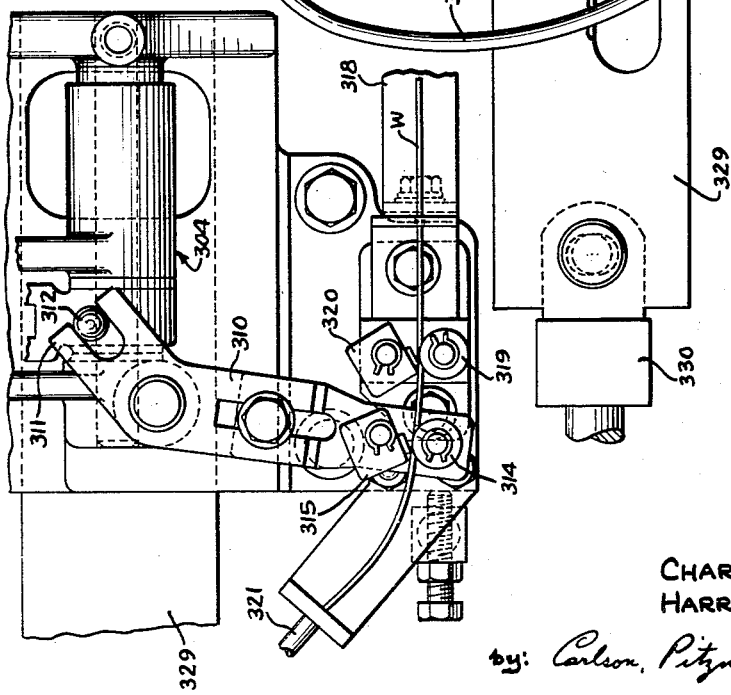
INVENTORS
CHARLES Z. MONROE
HARRY B. EGLESTON
by: Carlson, Pitzner, Hubbard & Wolf
ATTYS.

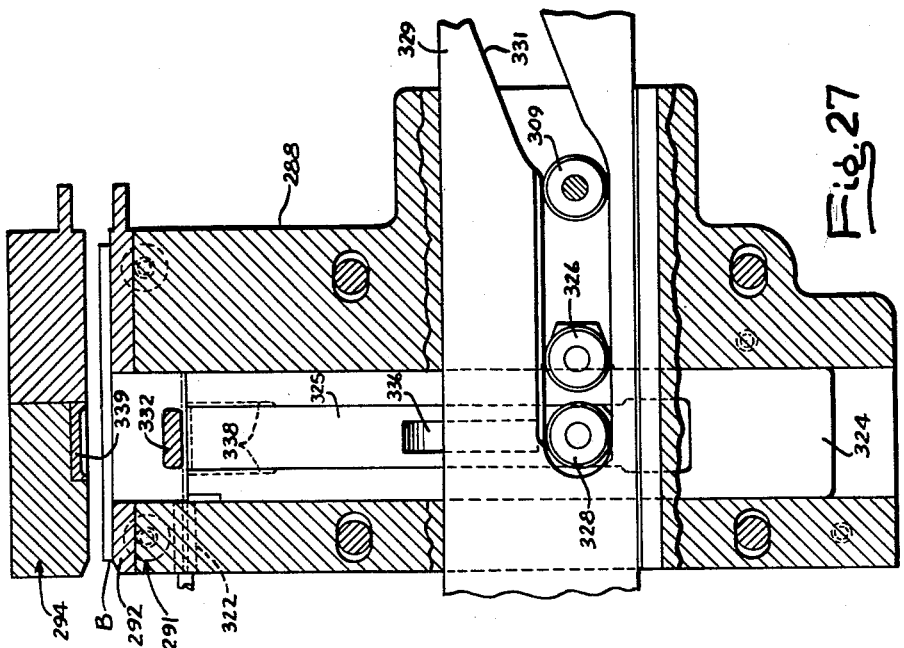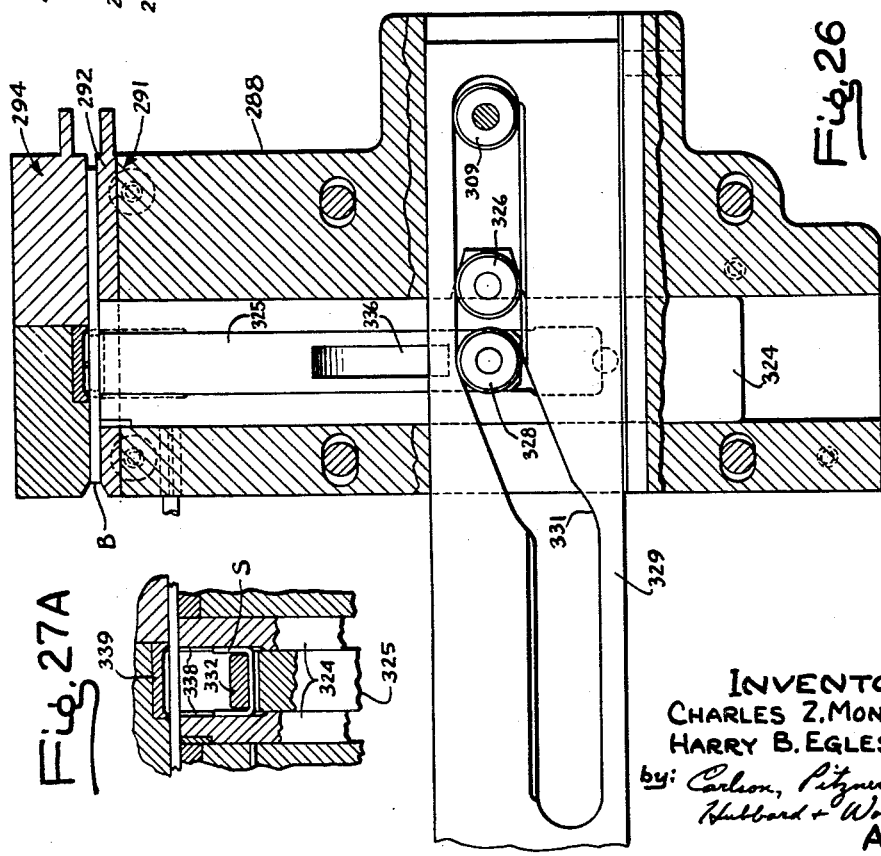

United States Patent Office 2,957,289
Patented Oct. 25, 1960

2,957,289

MACHINE FOR FABRICATING CONTAINERS

Charles Z. Monroe, Detroit, and Harry B. Egleston, Livonia, Mich., assignors, by mesne assignments, to Ex-Cell-O Corporation, Detroit, Mich., a corporation of Michigan Filed July 16, 1957, Ser. No. 672,200

11 Claims. (Cl. 53—186)

The present invention relates in general to carton forming machinery of the type disclosed in United States Patent Nos. 2,357,535 and 2,367,884, issued September 5, 1944, and January 23, 1945, respectively, on the application of Charles Z. Monroe. More specifically, the invention is concerned with an improved machine for forming, coating, filling, closing and sealing gable top containers of paperboard or the like. The machine finds particular, but not exclusive, utility in producing, from flat collapsed blanks, finished and filled cartons of the type shown in United States Patent No. 2,750,095, issued June 12, 1956 on the application of Carroll R. Alden.

One object of the invention is to provide a carton forming machine of the character set forth and which will be more compact than machines of the kind heretofore known so as to permit both loading and discharge to be handled by a single operator.

Another object is to provide a machine of the foregoing type having an improved sealing and stapling mechanism which will produce cartons with top closures which are more effectively sealed than in prior machines of this nature.

A further object is to provide a machine of the character set forth and which, when installed in a dairy or food packaging plant, will lend itself readily to sanitary maintenance without interference with its component mechanisms.

The foregoing and other objects will become apparent as the following description proceeds, taken together with the accompanying drawings, wherein:

Figures 1 and 2 are perspective views showing opposite sides of an illustrative machine embodying the present invention.

Fig. 3 is an enlarged end elevation of the blank magazine situated on top of the machine and taken from the rear of the stack.

Figs. 4 and 5 are enlarged elevation and plan views, respectively, of the blank magazine and feeder unit of the illustrative machine.

Figs. 5A, 5B and 5C are fragmentary plan views showing portions of the mechanism illustrated in Fig. 5 and, in the case of Figs. 5B and 5C, in different operative positions.

Figs. 6, 6A and 7 are enlarged elevational views illustrating the loading mechanism for applying an open-ended tubular blank to a mandrel.

Figs. 8 and 9 are vertical sectional views showing the mandrel assembly of the machine together with related mechanisms and assemblies.

Fig. 10 is an enlarged, fragmentary end elevation of the machine with portions of the cooling compartment broken away to show internal mechanism.

Fig. 11 is an enlarged vertical sectional view through the cooling compartment of the machine and taken in the plane of the line 11—11 in Fig. 12.

Fig. 12 is an enlarged horizontal sectional view through the cooling compartment, taken in the plane of the line 12—12 in Fig. 11.

Figs. 13 and 14 are elevation and plan views, respectively, showing the intermittently operated conveyors of the machine and the mechanisms cooperating therewith.

Figs. 15 and 16 are side and end elevational views showing the filler unit of the machine.

Fig. 17 is an enlarged, fragmentary perspective view showing certain details of the filler unit.

Figs. 18, 19 and 20 are enlarged vertical sectional views through one of the filler heads of the filler unit, and Figs. 18A and 18B are fragmentary views detailing certain parts of the filler unit.

Fig. 21 is a side elevation of the sealing and stapling mechanism of the machine, together with its supporting column.

Figs. 22 and 23 are enlarged fragmentary elevational views showing the jaws of the sealing and stapling mechanism, certain parts in Fig. 22 being shown in vertical section.

Figs. 24 and 25 are enlarged fragmentary plan views of that portion of the mechanism shown in Figs. 22 and 23.

Figs. 26, 27 and 27A are enlarged fragmentary plan views showing internal parts of the sealing and stapling mechanism in different operative positions.

Figs. 28 and 28A are enlarged fragmentary vertical sectional views detailing internal parts of the sealing and stapling mechanism in different operative positions.

Fig. 29 is a diagrammatic plan view showing the mechanical power connections between the principal mechanisms of the machine.

Figure 1:
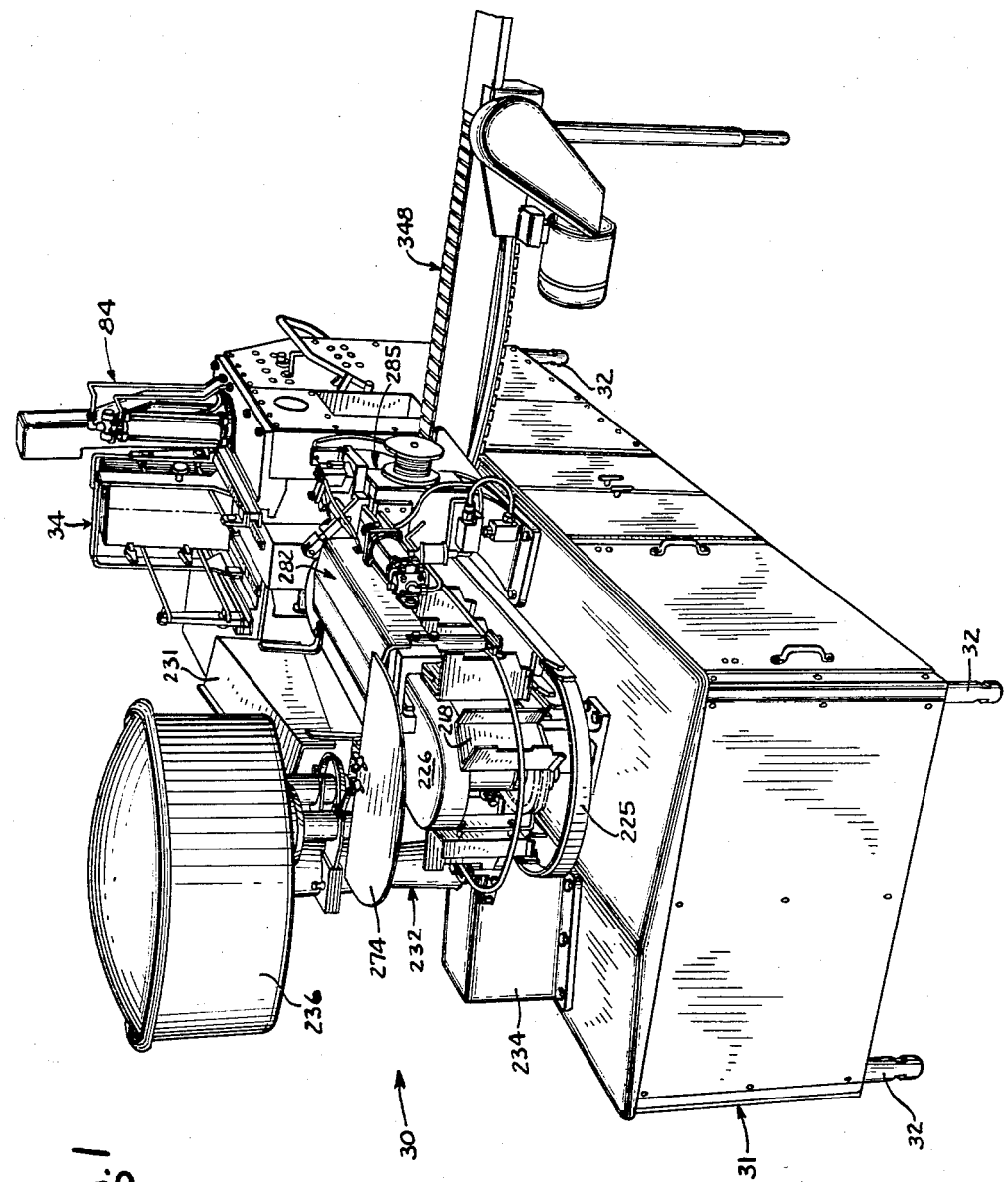

While the invention is susceptible of various modifications and alternative constructions, a certain illustrative embodiment has been shown in the drawings and will be described below in considerable detail. It should be understood, however, that there is no intention to limit the invention to the specific form disclosed, but on the contrary, the intention is to cover all modifications, alternative constructions and equivalents falling within the spirit and scope of the invention as expressed in the appended claims.

General machine organization

Referring more specifically to Figs. 1 and 2, the invention is there shown exemplified in a novel machine 30 for fabricating containers of paperboard or the like. The machine is adapted to receive a supply of flat tubular blanks which are appropriately cut and scored, and to operate on them in such a manner that a procession of filled and sealed containers is discharged therefrom. In the course of such operation, each flat tubular blank is withdrawn from a stack or magazine by means of a feeding mechanism, is erected into a tubular form and passed through a bottom forming mechanism, a moistureproof coating mechanism, and a cooling mechanism, the container then being filled, closed, sealed, and discharged from the machine.

The machine 30 is particularly well adapted to produce paper containers such as the familiar gable top paper milk container disclosed in Alden U.S. Patent No. 2,750,095, supra. This container comprises a single sheet of paper or paperboard cut and scored so as to be divided into a plurality of panels and areas which are utilized for the walls of the container and the closure parts when the container is erected. The blank, as presented to the machine, is folded upon itself and has its side seam already glued, thus defining a collapsed, open-ended tube.

When erected and subsequently processed in the machine 30, the resulting container is self-sustaining in shape, strong, sanitary, and low in cost.

The illustrative machine 30 is constructed upon a console 31 supported a slight distance above the floor as by means of legs 32. The console is subdivided into a number of compartments each readily accessible from the exterior of the machine by means of access apertures or suitable doors.

The interior of the console 31 houses mechanisms for moving, erecting, bottom-forming, coating and cooling the containers fabricated by the machine 30. The exterior of the console, on the other hand, supports mechanisms for moving, partially closing or breaking, filling, closing, sealing and stapling the containers after they emerge from the interior. These latter mechanisms are situated primarily on top of the console 31.

All of the foregoing mechanisms are grouped in the machine 30 in a highly compact manner, thereby minimizing the size of the machine. Such compactness is achieved, moreover, while maintaining a relatively rapid flow of containers through the machine and permitting ready access for cleaning and maintenance. By reason of this, and also in view of the fact that the feeding and discharging stations of the machine are placed in relatively close proximity, it is readily possible for a single operator to run the machine.

*Feeding and loading mechanism*

The machine 30 has a magazine 34 (Figs. 3, 4 and 5) situated on top of the console and adapted to hold a stack of flat, collapsed container blanks B. The blanks B are placed in the magazine in inverted position, with their top edges resting upon skids 35 and their side edges confined between guide bars 36. A pusher yoke 38, suitably biased by weights or springs, presses against the rear of the stack through abutments 39, urging the front of the stack against edge-engaging stop abutments 40 at the ends of the guide bars in the vicinity of guide bar bracket 41. The arrangement is such that, during operation of the machine, blanks can be easily withdrawn one at a time from the front of the stack and additional blanks may readily be inserted at the rear of the stack.

For the purpose of withdrawing the blanks B one by one from the magazine 34 and erecting each withdrawn blank into an open-ended, squared tube, a feeder unit 42 is provided (Figs. 4 and 5). The unit 42 comprises a pick-up head 44 mounted on a support 45 situated on top of the machine console 31. The pick-up head 44 is disposed for horizontal reciprocating movement and for that purpose is fixed to the free end of piston rod 46 of fluid actuator 48, the latter in this instance being an air cylinder operated from an appropriate compressed air source (not shown). Angular movement of the head 44 about the longitudinal axis of the piston rod 46 is precluded by guide rod 49 which is adapted to reciprocate in suitable bearings in support 45 and has a sliding bearing engagement with the pick-up head 44.

In order to effect engagement with the foremost blank B in the stack, the pick-up head 44 is provided with a plurality of suction cups 50 carried thereon by means of stems 51. Operatively associated with the suction cups 50 and the head 44 is a generally rectangular warping plate 52 of channel-shaped cross section and disposed with its concave side facing in the same direction as the open ends of the suction cups 50. The warping plate 52 is rigidly fixed to the guide rod 49 as by means of cap screw 54 and is resiliently held against stop shoulders 55 at the smaller ends of the suction cups 50 by means of biasing springs 56. This normally locates the warping plate 52 with the free edges of its outturned flanges situated in a plane which is slightly closer to the stack of blanks B than the plane of the open outer ends of the suction cups 50.

Pivotally mounted on the support 45 by means of bracket 58 is a blank opener 59. The latter is of gatelike form and is provided with an angle bar 60 at its free outer end adjacent the stack. The blank opener 59 is adapted to swing in a horizontal plane, being driven by the pick-up head 44 and in timed relation therewith by means of a drive yoke 61 and a suitable roller 62 mounted on the lower part of the head 44.

Control of the feeder unit 42 is accomplished by a number of electrically operated valves. One such valve 64 is mounted on the outer end of the air cylinder and operated by two switches, one causing the cylinder to extend the pick-up head 44 and the other causing it to reverse or retract. The first of these switches (not shown) is disposed in timed relation with the main drive of the machine. The second or reversing switch 65 (Fig. 5A) is housed within the support 45 and operated by dog 66 of underlying switch rod 68, the latter being fixed to bracket 69 of the pick-up head and movable therewith.

Another electrically operated control valve is the valve 70 which is mounted on top of the feeder unit support 45. The valve 70 in the present instance is a three-way valve, having one connection 71 to a vacuum pump, another connection 72 to the pick-up head 44 and vacuum cups 50 via a flexible hose 74, and a third connection 75 to the atmosphere. The valve 70 is controlled by switch 76 (Fig. 5A) disposed in overlying relation with and operated by the dog and rod 66, 68 which move with the pick-up head.

The operation of the feeder unit 42 will become more apparent upon particular reference to Figs. 5, 5A, 5B and 5C. At the outset, it will be assumed that the unit is in the condition illustrated in Fig. 5, with the pick-up head 44 fully retracted and the open-ended, erected blank having been transferred from the feeder unit to an underlying mandrel. A switch (not shown) operated in timed relation with the main drive of the machine actuates the control valve 64 and causes the piston rod of the air cylinder 48 to move outwardly (to the left as shown in the drawings), carrying the pick-up head 44 to its fully extended position illustrated in Fig. 5B. This brings the suction cup 50 firmly against the foremost blank B in the stack and also actuates the vacuum control valve 70 through limit switch 76 (Fig. 5A) so as to create a vacuum in the vacuum cups 50. In order to make certain that the vacuum cups 50 obtain secure engagement with the foremost blank B, the warping plate 52 is limited in its travel due to engagement between abutment 78 on the trailing end of the rod 49 and abutment 79 on the outer or right-hand end of the support 45. During the resulting additional travel of the pick-up head 44 after the motion of the warping plate has been arrested, the biasing springs 56 (Fig. 4) become further compressed. The forward or extending movement of the pick-up head 44 also serves to swing the blank opener 59 in a clockwise direction (as viewed in the drawings) by reason of engagement between the yoke 61 and the roller 62 carried by the pick-up head. This shifts the outer end of the blank opener clear of the end of the stack.

Arrival of the pick-up head 44 at its extended position results in actuation of the reversing switch 65 (Fig. 5A) operating the valve 64 and causing the piston rod of the air cylinder 48 to retract. During this action, the foremost blank B in the stack is withdrawn from the latter and the upstanding major bottom flap nearest the pick-up head is wiped under a deflector finger 80 (Figs. 4 and 5) which eliminates any interlocking of adjacent flaps and facilitates opening out of the blank. Retraction of the pick-up head 44 also results in movement of the end faces of the vacuum cups 50 to their normal position which is slightly to the right of the plane of the flange edges of the warping plate 52 (as viewed in the drawings). This creates a lateral bowing or bulging in the side panel of the blank engaged by the vacuum cups 50 and tends to straighten the blank vertically.

With further retracting movement of the pick-up head 44, the angle bar 60 at the free end of the blank opener 59 bears against the adjacent side edge of the blank B, exerting a diagonal compression on the blank and tending to open it up as illustrated in Fig. 5C. This process continues until the pick-up head 44 has reached its fully retracted position as shown in Fig. 5, the opener 59 having moved counterclockwise a sufficient distance to square up the open blank while compressing it against the vacuum cups 50, the warping plate 52 and a fixed abutment 81. Return of the pick-up head 44 to its retracted position serves to actuate the vacuum control valve 70 through the limit switch 76 (Fig. 5A), breaking the vacuum on the cups 50 at the proper time to enable the loading mechanism to transfer the squared blank B downwardly to the mandrel 82.

Referring more specifically to Figs. 6, 6A and 7, the loader unit 84 is there shown comprising an upright column 85 which is attached to the upper portion of the machine console in close proximity to the feeder unit 42. Mounted on the loader unit 84 for vertical reciprocating movement in timed relation with the other units of the machine is a loading paddle 86. This is accomplished by attaching the paddle 86 to a vertically movable head 88 which is adapted to slide along channel 89 defined between a pair of spaced apart vertical guides 90, 91 (Fig. 6).

Vertical movement of the head 88 along the channel 89 is derived in this instance from air cylinder 92 and an appropriate connecting linkage. Such linkage includes piston rod 94 of the air cylinder and a bracket 95 mounted on its free lower end. The bracket 95 has rigidly fixed thereto a rack 96 which meshes with a cooperating pinion 98 suitably journaled in the lower portion of the column 85. The pinion 98 is rigidly fixed to sprocket 99 which, in turn, meshes with a loop of roller chain 100. The latter also meshes with a sprocket 101 journaled in the upper portion of the column 85 (Fig. 7). The head 88 has pivotally fixed thereto a connecting link 102 which has at its lower end a pivotal connection 104 with the chain 100.

By reason of the foregoing arrangement, the head 88 and loading paddle 86 are adapted to move vertically in proportion to the stroke of the air cylinder piston rod 94 and in the same direction as the latter. The precise limits of this movement may be readily established by means of adjustable stops 105 and 106. Stop 105 is situated adjacent the lower end of the air cylinder 92. Stop 106, on the other hand, is situated on an arm 108 carried by depending bracket 109 extending downwardly from the column 85.

Mounted in the general vicinity of the bracket 109 and in vertical alinement with the underlying mandrel 82 are a plurality of fixed vertical guides 110, 111. These guides are also disposed in vertical alinement with the corners of squared blank B as it is presented from the feeder unit 42 to the loader unit 84 (Fig. 7). The guides 110 are joined at their lower ends by a plate 112 and the guides 111 are joined by a similar plate 114. During the downward stroke of the loading paddle 86, the open-ended squared blank B is driven downwardly into registry with the guides 110, 111 and then is slid telescopically onto the mandrel 82.

Provision is made for manipulating both major bottom flaps and one of the minor bottom flaps of the blank B as an incident to the downward stroke of the loading paddle 86. This is accomplished in part by pivotally attaching the loading paddle 86 to the head 88 in such a way that the loading paddle undergoes a substantial angular movement as it nears the bottom of its stroke. It is also accomplished by providing the loading paddle with a pair of laterally extended, upturned ears. In furtherance of such objective, the head 88 has rigidly fixed thereto a bracket 116. At its lower end the bracket 116 has a pivot pin 118 which engages slot 119 of an upstanding rib 120 on the loading paddle (Fig. 6). The rib 120 has at its lower end (as viewed in Fig. 6) a pivotal connection 121 with the lower end of a spring loaded plunger 122. Interposed between the plunger 122 and the bracket 116 is a loading spring 124 which tends to yieldably hold the plunger 122 in a downward position and hence to maintain the loading paddle 86 in the angular position shown in Figs. 6 and 7.

When the loading paddle 86 commences its downward stroke, the first part of the blank B with which it makes contact is one of the minor bottom flaps 125 which commences to fold inwardly and downwardly. The remaining minor bottom flap 126 remains upright. As the loading paddle 86 nears the bottom of its stroke, its upturned lower end 128 is accosted by the plate 112 at the lower end of the guides 110 (Fig. 6A). This causes the loading paddle 86 to swing downwardly in a counterclockwise direction (as viewed in Figs. 6 and 6A) about the pivotal connection 121. Such action serves to cam the minor bottom flap 125 down sufficiently to get it under a holddown shoe (not shown) upon movement of the mandrel in the direction of the arrow in Fig. 6A. Such action also causes the ears 115 to bear downwardly against the inner faces of major bottom flaps 129, 130, causing them to spread outwardly with respect to the blank B and the mandrel 82 in preparation for engagement with the glue rolls of the machine. Movement of the mandrel 82 and blank B in the direction of the arrow also serves to cam down the leading minor bottom flap 126 without interference by the loading paddle 86. After the mandrel and blank have moved a sufficient distance to preclude jamming or inadvertent movement of the bottom flaps, the loading paddle 86 and its drive mechanism are returned to their elevated position and the loading paddle 86 resumes its angular position shown in Figs. 6 and 7.

In order to insure operation of the loader unit 84 in properly timed relation with the feeder unit 42, the controls for the two mechanisms are provided with a safety interlock. In the present instance, this involves the use of a safety switch 131 operated by dog 66 and switch rod 68 which move with the pick-up head 44 (Figs. 5 and 5A). The switch 131 is connected into the control circuit of the loader unit air cylinder 92 in such a way that the loading paddle 86 cannot proceed with its downward stroke unit the feeder unit pick-up head 44 has been fully retracted.

Mandrel and stripper mechanisms

Figure 9:
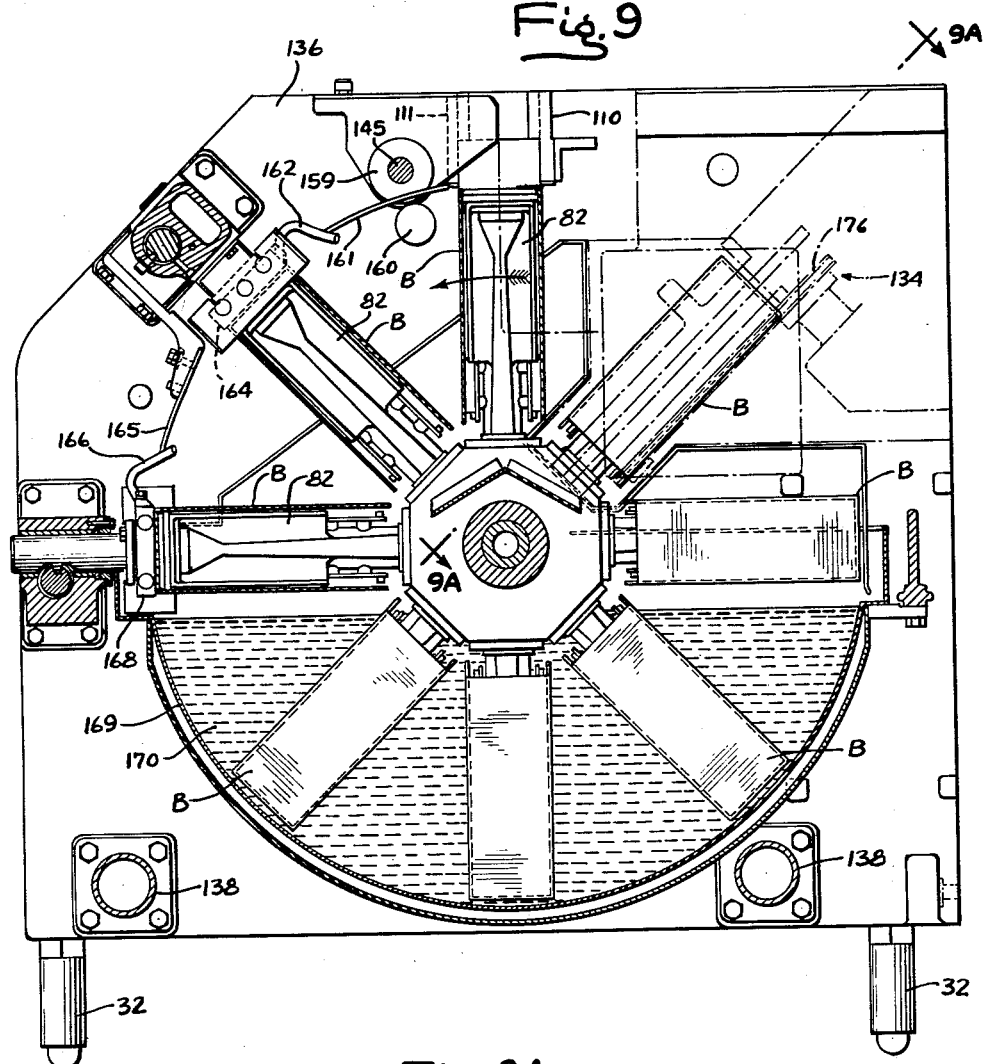

The mandrel and stripper mechanisms 132, 134 are situated at the high end of the machine console between a pair of laterally spaced side frames 135, 136 (Figs. 8 and 9). The side frames are rigidly joined together by a plurality of heavy flanged struts 138. The side frame 135 is relatively thick and also serves as a mounting for main drive motor 139 of the machine, reduction gear 140 and main drive shaft 141 associated therewith, as well as a mounting for glue roll drive motor 142 and reduction gear 144 and shaft 145 associated with the motor 142.

The mandrel assembly, in the present instance comprising eight of the mandrels 82, is journaled in horizontally alined bearings carried by the side frames 135, 136. This assembly also includes a composite hollow shaft 146 having an octagonal hub 148 on which the respective mandrels 82 are radially mounted. The assembly and shaft 146 are driven intermittently by means of a spider 149 fixed to one end of the shaft and operated by barrel cam 150 of main drive shaft 141 (Fig. 8). The spider end of the shaft 146 also includes a normally disengaged hand crank shaft 151 which, when pushed in, is adapted to turn over the main drive of the machine via bevel pinions 152, 154.

In some instances, it may be desirable to heat the outer ends of the mandrels to speed up the drying of the adhesive on the bottom flaps. This may readily be accomplished by the use of an electric heater 155 at the outer end portion of each mandrel (Fig. 8), power being fed via a slip ring assembly 156 in the side frame 136 and the conductors 158.

The mandrel assembly is driven with a step-by-step motion, or indexed, so that each mandrel 82 passes into underlying registration with the fixed guides 110, 111, receives a squared blank B from the loader unit 84, and processes the blank as it moves the same through a series of sequentially arranged stations. Referring more specifically to Fig. 9, it will be noted that each mandrel 82, having received a squared blank B, moves counterclockwise (as indicated by the arrow in the drawing). In the course of the first step of counterclockwise movement, the inside faces of the outwardly spread major bottom flaps of the blank B are coated with adhesive as they pass through glue rolls 159, 160, the minor bottom flaps being held down by shoe 161. One of the major bottom flaps is then plowed over against the minor bottom flaps by the finger 162, following which the mandrel 82 completes its first step and stops in the vicinity of a heated pressure pad 164. The latter thereupon moves inwardly toward the end of the mandrel and presses the infolded major bottom flap against the minor bottom flaps and the end of the mandrel to effect a good adhesive seal. The pressure pad 164 then withdraws and the mandrel 82 proceeds with its next step of indexing movement. During this step, the infolded flaps pass under holddown shoe 165 and finger 166 plows over the remaining outwardly spread major bottom flap, causing it to fold down against the previously infolded flaps. Upon completion of this step, the mandrel and blank stop at the next station where another heated pressure pad 168 presses the newly folded major bottom flap against the other flaps and the bottom of the mandrel to complete the adhesive seal of the bottom closure of the blank B. The pad 168 then withdraws and the mandrel proceeds to enter a tank 169 of molten paraffin 170 or other appropriate moistureproofing material where it remains for several successive steps of movement. This causes the blank B to undergo complete immersion and impregnates its inner and outer surfaces with a moistureproof coating. The tank 169 is provided with a steam jacket 171 fed by steam line 172 (Fig. 8) to maintain the paraffin in a molten condition. Further movement of the mandrel assembly ultimately carries the mandrel 82 and blank B out of the bath of paraffin 170 and into the stripping station adjacent the stripper mechanism 134.

The stripper mechanism 134 (Figs. 9 and 9A) is adapted to slide the erected and coated blank B off the mandrel 82 and into a transfer chute 174 which takes it to the lower level of the machine where it is cooled. The chute 174 is heated as by means of steam heating coils 175 so that paraffin drippings will not accumulate in the chute.

The mechanism 134 in this instance comprises a pair of sprockets 176, 178 driven in timed relation with the mandrel assembly and meshing with a loop of chain 179. The chain 179 carries a protruding pin 180 which accosts one of the lower edges of the blank B and slides it upwardly and off the mandrel, as indicated by the arrow in Fig. 9A. A longitudinal clearance recess 181 for the pin 180 is provided in the head of the mandrel. The blank moves off the mandrel and into the chute bottom-first, turns through a considerable angle, and lands bottom-first in the lower level of the machine.

Cooling compartment

The cooling compartment 182 (Figs. 10–14, inclusive) forms a major portion of the machine console 31. The compartment 182 is nested close by the side frames 135, 136, and in compact, underlying relation with the mechanisms for partially closing or breaking, filling, closing, sealing and stapling the erected and coated blanks B or containers. A solid, impervious roof panel 184 having a longitudinally extending, raised central portion 185 and downturned marginal edge portions 186 covers the cooling compartment 182 and provides a fluidtight barrier between it and the overlying machine components.

The compartment 182 is provided with a conveyor 188 (Figs. 10 and 13) which in this instance comprises a loop of chain 189 carried by a pair of sprockets 190, 191 adapted to rotate and to move the chain 189 in a horizontal plane. At longitudinally spaced intervals, the chain is provided with a plurality of outwardly extending baskets or carriers 192 which are adapted to move bodily therewith in an orbit substantially concentric with that of the chain 189. The conveyor 188 is driven with a step-by-step motion in timed relation of other mechanisms in the machine by means of a vertically disposed drive shaft 194 and a coupling 195. The compartment 182 is adapted to receive a procession of freshly coated containers B via the transfer chute 174, each such container landing bottom first as mentioned previously herein. Each incoming container also registers with a carrier 192 adjacent the base of the chute 174 and the carrier subsequently starts the container through the cooling compartment.

The first portion of travel of each container B takes it over a wiper rail assembly 196 comprising a pair of bottom supporting rails 198 which are mounted in a heated tray 199. This device simply causes excess paraffin to melt off the container B, and particularly any globules of paraffin around the lower portion of the container. The conveyor and carrier 192 next moves the container B over a cold water trough 200, the container dropping down slightly so that its lower portion becomes immersed in the cold water. This tends to harden and solidify the paraffin coating about the lower portion of the container. From the water trough, each container B is moved in a path which doubles back and thus gives the paraffin coating considerable time to cool and harden on the container.

Cooling air is supplied to the compartment 182 from a plenum chamber 201 which extends beneath the compartment 182 for a substantial distance. As indicated in Fig. 11, the plenum chamber 201 is adapted to discharge cooled air beneath the outermost row of containers so that it flows upwardly along their side walls. A plurality of slotted discharge openings in the top of the plenum chamber 201 beneath the innermost row of containers also causes some air to discharge beneath them, such action being facilitated by the use of a baffle 202 inside the plenum chamber. Cooling air is supplied to the plenum chamber 201 via a plurality of blowers 204, the latter being driven in unison on a common shaft 205 by means of blower drive motor 206 (Fig. 10). The blowers 204 obtain their supply of air through cooling coil assembly 208 (Figs. 11 and 12). The cooling coil assembly 208 is so situated that all air entering the suction side of the blowers 204 must first pass through the assembly 208.

Situated in the space between cooling coil assembly 208 and the blowers 204, and mounted near the top of the compartment 182, is a water cooler 209 (Figs. 11 and 12). Water from the trough 200 is circulated through the cooler 209 in order to maintain its temperature at the desired level.

With usage of the machine, there is some tendency for condensation to accumulate on the underside of the roof 184 of the cooling compartment 182. In order to protect the sanitary integrity of the containers B, the compartment 182 is provided with one or more condensation trays 210 to collect and drain off condensation which might otherwise fall into the containers B.

Access to the cooling compartment 182 for inspection or for maintenance of any of the component mechanisms situated therein may readily be had by opening up one or more of the removable side panels thereof.

Elevator and breaker mechanism

After each container B has completed its orbital path in the cooling compartment 182, it is presented to an elevator and breaker mechanism 211 (Figs. 2 and 14) driven from continuous drive shaft 212 of the machine. Since the present invention is not concerned with the details of this mechanism, it will suffice to point out that the mechanism 211 includes a guide chute 214 and an elevating device somewhat similar to the stripper unit 134. In this case, a projecting pin 215 on a vertical loop of chain 216 accosts the bottom of the container B to be discharged from the cooling compartment 182 and elevates the container, top first. The container is thereupon presented to a waiting carrier 218, a simple latch (not shown) preventing the container from dropping back down into the cooling compartment 182.

The carrier 218 is one of several which are components of upper conveyor 219 (Figs. 13 and 14). The latter comprises a pair of vertically spaced loops of chain 220 trained around corresponding pairs of sprockets 221, 222. The sprockets 222 are mounted on vertical shaft 224 which has a direct gear connection with the drive shaft 194 of the conveyor 188. Mounted in underlying relation with the carriers 218 of the conveyor 219 and in overlying relation with the top 184 of the cooling compartment is a supporting ramp 225 along which the containers B are slid by the carriers 218. The mechanism of the conveyor 219 is protected against spillage of milk or other fluid by means of a relatively long overlying cover 226 having appropriately rounded ends. The conveyor 219 is driven with a step-by-step movement in unison with the conveyor 188 but in the opposite direction. This is accomplished through conveyor drive shaft 228 and gear box 229.

The mechanism 211 has two operating stations for each container B after it emerges from the elevator chute 214. In one of these stations, certain portions of the container top closure are partially folded or "broken" along their score lines. In the other station, the remaining portions of the top closure are "broken." This is accomplished in a well known manner by finger elements which move with a vertically reciprocating head 230 (Fig. 2) driven from the shaft 212 in timed relation with the conveyor 219. The head 230 is protected by means of an overlying splash guard 231.

*Filler unit*

Mounted on the impervious top 184 of the cooling compartment and on the same side of the conveyor 219 as the elevator and breaker mechanism 211 is a filler unit 232 (Figs. 15-20, inclusive). The filler unit 232 comprises a base 234 (Figs. 2, 15 and 16) having an upstanding column 235 which carries a supply tank 236 at its upper end. The tank 236 is adapted to hold a relatively large amount of milk or other fluid to be packaged in the containers processed by the machine 30. Mounted within the supply tank 236 and projecting downwardly therefrom are one or more filler heads 238 (Figs. 15, 16, 18, 19 and 20). In the present instance, the filler unit 232 has two such heads which are identical, each head being mounted in overlying relation with a corresponding container station along the supporting ramp 225. In this case, two-stage filling is employed, each filler head 238 supplying half the contents of the container and each container passing successively under each filler head.

Power for actuating the moving parts of the filler unit 232 is derived from continuously driven shaft 212. The latter operates a cam mechanism within the base 234 and moves the filler parts intermittently in timed relation with the motion of the upper conveyor 219.

As indicated in Figs. 18 through 20, each filler head 238 comprises a fixed cylinder 239 detachably and sealingly mounted in a suitable aperture in the bottom of the supply tank 236. Adjustably and sealingly mounted within the depending portion of the fixed cylinder 239 is a calibration bushing 240. Slidably and sealingly mounted within the calibration bushing is an operating sleeve 241 adapted to be reciprocated vertically by means of a forked arm 242. The latter is rigidly fixed upon a bracket 244 which is rigidly secured to a movable sleeve 245 situated on the column 235 and reciprocated vertically by means of the filler unit cam mechanism. The top of the movable sleeve 245 is protectively enclosed by means of a skirt 246 (Figs. 15 and 16) fixed to the top of the column 235.

Telescopically mounted on the upper end of the operating sleeve 241 (Figs. 18, 19, 20) and resiliently biased downwardly with respect thereto by means of spring 248 is a displacement cylinder 249 which is somewhat bell-shaped. Adjacent its lower external periphery the displacement cylinder 249 is provided with an O-ring 250 adapting the displacement cylinder to sealingly engage the inner peripheral wall of the fixed cylinder 239 which projects upwardly into the supply tank. Within the interior of the displacement cylinder 249 the operating sleeve 241 is provided with a lateral enlargement or shoulder 251 which is adapted to engage the inner wall of the displacement cylinder in the event of sufficient relative sliding between the latter and the operating sleeve. The operating sleeve is also provided with relatively long filling slots 252 providing communication between the interior of the operating sleeve and the interiors of the displacement cylinder and the fixed cylinder.

Concentrically mounted within the operating sleeve 241 and rigidly fixed with respect thereto is an air exhaust tube 254. The latter carries adjacent its lower end a detachable orifice control collar 255 having one or more radial abutments 256 which engage a suitable stop shoulder 258 inside the operating sleeve. The upper end of the exhaust tube 254 is held in place by means of spring retainer collar 259 partially nested within the upper end of the operating sleeve 241. A retainer clip 260 attached to the upper end of the exhaust tube 254 prevents the spring retainer collar 259 from slipping off the tube. Spring 248, compressed between the retainer collar 259 and the upper end of the displacement cylinder 249, provides seating pressure for the latter and also maintains the exhaust tube 254 in position within the operating sleeve 241.

A dispensing valve 261 is mounted adjacent the lower end of the operating sleeve 241. In this instance, the valve comprises a head 262 of frusto-conical shape fixed to the lower end of the air exhaust tube 254 and a container-actuated valve bushing 264 sealingly and slidably mounted on the lower end of the operating sleeve.

The head 262 is maintained in predetermined spaced relation with the internally tapered lower end portion 265 of the operating sleeve 241 so as to define an annular orifice of appropriate size for the viscosity of the fluid to be dispensed. The orifice control collar 255 positions the head 262 and thereby determines the size of the orifice. The vertical length of the collar 255 is somewhat greater than that of its radial abutments 256. The size of the dispensing orifice may, accordingly, be altered by detaching the collar 255 and reassembling it in inverted position on the tube 254.

The valve bushing 264 is formed with a tapered seat 266 at its lower end and which is adapted to sealingly engage a resilient O-ring carried by the head 262. Engagement between the seat and O-ring 266, 268 when the bushing 264 is down, effectively closes the dispensing orifice.

For the purpose of opening the dispensing valve 261 upon descent of the operating sleeve 241 into filling position over a container B, provision is made for raising the valve actuating bushing 264 as an incident to such motion. In furtherance of this objective, the bushing 264 is provided with a generally rectangular container stop 269 (Figs. 15, 16 and 17). As the sleeve 241 descends, the container stop 269 is accosted by the leading and trailing top edges of the container B, sliding the bushing 264 upwardly relative to the sleeve 241 and opening the dispensing orifice. In order to maintain the stop 269 in proper position and prevent rotational movement of the bushing 264 on the sleeve 241, the upper portion of the bushing 264 is cut away so that it will achieve a comfortable sliding fit between the prongs of the forked drive arm 242 which operates the sleeve 241.

To keep the mouth of the container B in a fully open position and also preserve sufficient stiffness in the container walls to lift the container stop 269, a spreader rail 270 of substantially U-shaped form (Fig. 17) is fixed in overlying relation with the filling stations. The spreader rail 270 is carried on a bracket 271 fixed to the cover 226 and is arranged with the rounded end of the U pointing in the direction from which the containers are received for filling. The rail 270 is so proportioned that it enters between the upstanding, opposed top flaps of the container and maintains them in fully spread relation.

To prevent accumulated condensation on the supply tank 236 or the filler heads 238 from dripping into the containers as they pass beneath these members, each bushing 264 is provided with a suitable annular drip pan 272 (Figs. 15, 16 and 17). In addition, a downwardly inclined semi-circular protective panel 274 (Figs. 1 and 2) is interposed between the tank 236 and the outer end of the conveyor 219. Further protection is also afforded by the splash guard 231 which extends under the tank 236.

The operation of the filler head 238 may readily be followed by starting with the head in the condition illustrated in Fig. 18. At this time, the displacement cylinder 249 and operating sleeve 241 are in their fully raised position, permitting fluid from the tank 236 to flow freely into the interior of the sleeve 241 and into the interiors of the cylinders 239, 249. As the forked drive plate 242 moves the operating sleeve 241 downwardly, the lower end of the displacement cylinder 249 commences to telescope into the open upper end of the fixed cylinder 239. This pressurizes the fluid trapped between the interiors of the cylinders 239, 249 and between the interior of the sleeve 241 and the exterior of the tube 254, causing excess fluid to surge upwardly and out through overflow vents 275 in the retainer collar and vents 276 in the operating sleeve. As the operating sleeve 241 descends further, the displacement cylinder 249 seats firmly within the fixed cylinder 239 but the sleeve 241 continues to descend. The shoulder 251 thereupon separates from the inner wall of the displacement cylinder 249 and, because the diameter of the sleeve 241 is somewhat larger above the shoulder 251 than below it, additional fluid continues to be displaced or metered out of the interior of the head 238 via the vents 276. This metering action continues until the operating sleeve 241 has reached the extreme lower limit of its stroke.

As the operating sleeve 241 and dispensing valve 261 approach the lower limit of their travel, and provided that there is a container in the station underlying the filler head 238, the leading and trailing opposed top edges of the container B will accost the container top stop 269. Such action raises the bushing 264, opening the dispensing valve orifice as indicated in Fig. 19 and permitting a measured quantity of fluid from the interior of the filler head 238 to be discharged into the underlying container. The flow of discharged fluid tends to spread out and follow the interior walls of the container, with the result that air displaced by the incoming fluid is discharged centrally and upwardly from the container via the exhaust tube 254. The existence of an adequate air exhaust passage at this point materially reduces any tendency toward foaming.

After the contents of the filler head 238 have been discharged, the operating sleeve 241 is driven upwardly by the filler unit cam mechanism and the forked drive arm 242. As an incident to this upward travel, the valve actuating bushing 264 descends and closes the discharge orifice. The shoulder 251 of the operating sleeve 241 moves upwardly into contact with the inner wall of the displacement cylinder 249, lifting the same and restoring the parts of the filler head to the position indicated in Fig. 18 for the start of another cycle.

For the purpose of calibrating or adjusting the quantity of fluid dispensed by the filler head 238, the calibration bushing 240 may be precisely adjusted relative to the fixed cylinder 239 so as to change the internal volume of the latter. This is accomplished in the present instance by means of a locating pin 278 projecting from the bushing 240 and adapted to move vertically in a suitable slot 279 in the wall of the fixed cylinder 239 (Figs. 18, 18A, 18B). The calibration bushing 240 and locating pin 278 may be adjustably positioned by engagement with any selected one of a plurality of calibration apertures 280 in a spring clip 281. The clip 281 is mounted in a shallow groove in the outer periphery of the fixed cylinder 239 and is held in place by means of a simple snap fit.

Closer mechanism

After the containers leave the filler unit 232 they are moved around the outer end of the conveyor 219 and presented to a closer mechanism 282 situated on the opposite side of the conveyor from the filler unit (Figs. 1 and 14). Since the present invention is not concerned with the details of the closer mechanism, it will suffice to point out that the latter is adapted to fold the elements of the container top closure into closed position prior to the sealing and stapling operation. The closer mechanism 282 is preferably of a type known in the art, comprising a tunnel-like cover 284 mounted over the path of the carriers 218 and having a plurality of longitudinally extending, fixed guides (not shown) which cam and manipulate the top closure elements of the container. Accordingly, as each container emerges from the tunnel 284, its top closure parts, and particularly the elements of its upstanding top rib, are properly interlocked and folded preparatory to sealing and stapling.

Sealing and stapling mechanism

The sealing and stapling mechanism 285 (Figs. 21 to 28A, inclusive) is situated outboard of the upper conveyor 219 and adjacent the discharge end of the closer mechanism 282. The mechanism 285 is adapted to seal and staple the top closure rib of each container at a single station in the travel of the container. The staple is, in effect, driven through a sealed top rib resulting in a tighter structure than that produced where stapling and sealing are separate operations.

The sealing and stapling mechanism 282 comprises a hollow boxlike column 286 (Fig. 21) rigidly fixed in upstanding relation on the impervious top wall 184 of the cooling compartment. The column 286 conveniently houses a number of air and electric service lines which are required for operation of the mechanism 285. At the top of the column 286 there is mounted a bedplate 288 which supports most of the moving parts of the mechanism. A laterally extending bracket 289 also fixed to the upper portion of the column 286 extends longitudinally of the machine and supports a fluid actuator, in this instance, an air cylinder 290, at its outer end for imparting movement to the mechanism 285.

The bedplate 288 projects inwardly toward the conveyor 219 and has a squared end which is adapted to abut against the top rib of the container when the latter is in the sealing and stapling station. This end of the bedplate serves as a fixed jaw 291 and for that purpose may be provided with a hardened insert 292. Operatively associated with the fixed jaw 291 is a movable jaw 294 (Figs. 22, 23, 27, 27A) which has a hardened insert 295 and, in addition, an electric heater element 296. The movable jaw 294 is provided with an integrally attached jaw arm 298 pivotally mounted on the bedplate by means of pin 299. The upper end of the jaw arm 298 is pivotally connected to an adjustable link 300 which, in turn, is pivotally attached to arms 301, 302 of bell crank 304. The bell crank 304 is journaled upon a fixed shaft 305 and is so constructed that its arms 301, 302 normally move in unison, being joined together by means of shear pin 306.

The bell crank 304, including the arms 301, 302, is adapted to be oscillated upon the shaft 305 for actuation of the movable jaw 294. For this purpose, the bell crank 304 is provided with an integral depending arm 308 (Figs. 22, 23). At its lower end, the arm 308 has a roller 309 journaled thereon, the roller having a convex peripheral surface.

Pivotally mounted on the bedplate 288 for oscillatory movement in a general horizontal plane is a lever 310 (Figs. 22, 23, 24, 25) which is actuated by means of a yoke 311 and a ball-shaped pin 312 fixed to the bell crank 304. The lever 310 has vertically offset end portions and carries adjacent its free end a guide roller 314 and a wire gripper 315. Upon being subjected to a given increment of angular movement by the bell crank 304, the lever 310 is adapted to feed a predetermined length of wire into the sealing and stapling mechanism 285 in timed relation to the movement of its other component parts. The wire W is drawn from a suitable spool 316 (Figs. 1 and 21) journaled on the column 286. The wire W is led along a resilient, semi-circular guide 318 which provides sufficient slack to prevent wire breakage in event of a sudden jerk. The wire W is then passed through a fixed guide roller 319 and gripper block 320 which prevent retrograde movement, through the guide roller 314 and gripper block 315 of the lever 310, and then into a tubular guide 321 leading into the bedplate 288. The latter preferably has a hardened sleeve 322 for receiving the wire W and holding the same during cut-off or shearing.

Slidably mounted within the bedplate 288 and disposed in perpendicular relation to the jaws 291, 294, are a cut-off and bender element 324 and a staple driver 325 (Figs. 26, 27, 27A). Both of these elements are movable relative to the bedplate 288 and relative to each other. They are adapted to be brought into abutting relation with the top rib of the container via a suitable aperture in the fixed jaw 291. Sliding movement may be imparted to the cut-off and bender element 324 by means of a roller 326 and to the driver 325 by means of another roller 328.

For the purpose of actuating the movable parts in properly timed relation with each other, the mechanism 285 is provided with a cam bar 329 slidably mounted in a suitable guideway which happens to be substantially parallel with the faces of the jaws 291 and 294. The cam bar is operated by means of the air cylinder 290 through an appropriate connecting yoke 330 (Fig. 21). The bar 329 is formed with a cam path 331 which confines and guidingly moves the rollers 309, 326 and 328 and their associated parts.

Operatively associated with the cut-off and bender 324 and with the driver 325 is a former block 332 (Figs. 27, 27A) about which the wire W is bent as a staple is being formed. The former block 332 is carried on a resiliently biased, pivotally mounted arm 334 (Figs. 28, 28A) and is positively cammed into lowered position by means of a follower finger 335 which cooperates with a groove 336 in the driver. The former block 332 is cammed into raised position directly by the driving end of the driver 325.

The operation of the sealing and stapling mechanism 285 will become more apparent upon further reference to Figs. 21 to 28A, inclusive. Starting with the cam bar 329 in its right-hand position, as viewed in Fig. 27, it will be noted that all three rollers 309, 326 and 328 are in their remote positions with respect to the jaws 291 and 294. Under these conditions, the movable jaw 294 is open and the mechanism is ready to receive the top rib of a container B.

As it moves into its station in underlying relation with the mechanism 285, the container actuates a switch which initiates the operating cycle of the mechanism. The air cylinder 290 thereupon causes the cam bar 329 to commence moving to the left, as viewed in Fig. 27. The cam path 331 also moves to the left and causes the jaw actuating roller 309 to move toward the jaws. This ultimately shifts the roller 309 to its closest position with respect to the jaws and actuates the bell crank 304 to effect clamping of the movable jaw 294 against the top rib of the container and the fixed jaw 291. At the same time, the bell crank 304 oscillates the lever 310 in a clockwise direction as viewed in Fig. 24. This feeds a length of wire into the stapler mechanism via the hardened sleeve or die block 322. At the same time, the former block 332 is in its lower position adjacent the newly fed length of wire.

Further leftward movement of the cam bar 329 next shifts the roller 326 toward the jaws, resulting in a corresponding movement of the cut-off and bender in that direction. This action cuts the wire to appropriate length for a staple and bends the wire around the former block 332, the wire entering alinement grooves 338 in the walls of the cut-off and bender element. At this point, the staple S has been formed and is held in position with the ends of the staple legs pointing toward the top rib of the container (Fig. 27A).

Further leftward movement of the cam bar 329 results in shifting the roller 328 toward the jaws, causing the driver 325 to move rapidly in that direction. Such movement of the driver cams the former block 332 out of the way and forces the staple legs through the top rib of the container, at the same time bending their projecting ends against clincher block 339 in the face of the movable jaw 294.

Power transmission

Turning now to Fig. 29, a diagrammatic plan view is there presented showing the principal mechanisms of the machine connected for mechanical movement in properly timed relation with each other. Driving power for these mechanisms is supplied from main drive motor 139 which runs continuously. The motor 139 is connected to reduction gear 140 having an output shaft which protrudes from the reduction gear at both ends. The right-hand end of this output shaft is connected to a main drive shaft 141 which has a barrel cam 150 fixed thereon. The end of the drive shaft 141 remote from the reduction gear 140 is provided with a plurality of control and indicating switches 340, including switches for controlling the operation of the feeder unit 42, the loader unit 84, and the sealing and stapling mechanism 285.

The barrel cam 150 rotates continuously with the shaft 141 but is adapted to impart intermittent driving movement to a spider 149 fixed to mandrel assembly shaft 146. The shaft 146 is drivingly secured to the mandrel assembly hub 148 which carries the mandrels 82 and all of these members move intermittently in accordance with the cam actuated motion of the spider 149. The intermittent motion of the mandrel assembly shaft 146 is transmitted to the lower and upper conveyor 188, 219, via gears 341, 342, connecting shaft 228 and gears 344 and 345.

The opposite or left-hand end of the reduction gear output shaft is directly connected to continuously driven shaft 212. The latter drives the gearing and cam mechanisms associated respectively with the elevator and breaker mechanism 211 and the filler unit 232.

Synopsis of operation

While those skilled in the art will readily appreciate the operation of the machine 30, it might be helpful by way of synopsis to trace the progress of a single blank through the machine. A stack of container blanks having been placed in the magazine 34 with their bottom flaps up, the foremost blank B in the stack is then withdrawn therefrom by the feeder unit 42 (Figs. 4, 5, 5B, 5C). In its operation, the feeder unit squares up the blank and forms it into an open-ended tube with the bottom flaps up. The loader unit 84 (Figs. 6, 6A, 7) then transfers the squared blank B from the feeder unit to an underlying alined mandrel 82. During this transfer, the trailing minor bottom flap is infolded, and the major bottom flaps are spread outwardly, by the action of the loading paddle 86.

Figure 9A:
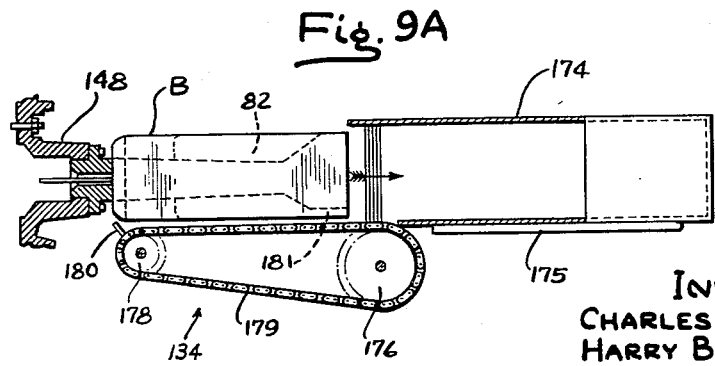
Fig. 9A is an enlarged sectional view of the stripper mechanism taken in the plane of the line 9A—9A in Fig. 9.

The mandrel 82 (Figs. 8, 9), being a part of the mandrel assembly, thereupon advances with a step-by-step motion, causing the other minor bottom flap to be infolded, passing the outturned major bottom flaps through the glue rolls, and successively folded over and sealing each major bottom flap to complete the bottom closure of the container. The mandrel 82 then immerses the blank B in a bath of moistureproofing material such as paraffin, coatin it thoroughly inside and out. After several steps of motion through the paraffin bath, the coated blank B is drained and then stripped from the mandrel 82 (Fig. 9A). The stripped blank passes through a transfer chute 74 and lands bottom first in the cooling compartment 182.

In the cooling compartment 182 (Figs. 10 to 14, inclusive), the erected and coated blank B is advanced by a lower conveyor 188 and cooled by air from an underlying plenum chamber 201. The blank traverses a heated wiper rail assembly 186 to drain off excess paraffin and then traverses a cold water trough 200 which hardens the paraffin on its bottom. The erected blank then continues on its path ultimately arriving at a discharge point where it is picked up by an elevating mechanism and passed through a guide chute 214 to the upper level of the machine (Figs. 12, 14). At that point, the blank is picked up by the upper conveyor 219 and advanced with a step-by-step motion through the breaker mechanism 211 where its top closure parts are partially folded or "broken."

The erected and moistureproofed blank B is then advanced by the conveyor 219 to the filler unit 232 (Figs. 15 to 20, inclusive) where it receives half of its contents at the first filling station and the remaining half at the next filling station. The conveyor 219 then moves the erected, coated and filled blank through the closer mechanism 282 which interlocks and folds the elements of its top rib and top closure.

The blank then enters the sealing and stapling mechanism 285 (Figs. 21 to 28A, inclusive) where its top rib is firmly clamped between two jaws, sealed by means of heat, and receives a staple. The completed and filled blank then emerges as a finished container from the sealing and stapling mechanism 285 and is led by discharging guide rails 346 to an appropriate discharge conveyor 348.

We claim as our invention:

1. A container fabricating machine comprising the combination of a pair of side frames fixed in spaced apart relation with each other, a blank magazine mounted above said side frames, a mandrel assembly journaled for rotation between said side frames, a feeder unit and a loader unit both mounted on said side frames adjacent said magazine and adapted to apply blanks to said mandrel assembly, means for applying a moistureproof coating to blanks on said mandrel assembly, a cooling compartment adjacent said side frames and having a width comparable to the distance between the outside faces of said side frames, a breaker mechanism and a filler mechanism mounted above said cooling compartment, a closer mechanism and a sealing and stapling mechanism also mounted above said cooling compartment, and a solid impervious top panel disposed in overlying relation with said cooling compartment and in underlying relation with said mechanisms, said panel having a longitudinally extending raised central portion to facilitate drainage.

2. A container fabricating machine comprising, in combination, a pair of side frames fixed in spaced apart relation with each other, a blank magazine mounted on said side frames, a feeder unit and a loader unit both mounted on said side frames adjacent said magazine, a main drive motor mounted on one of said side frames and driven continuously, a mandrel assembly journaled for rotation between said side frames and having a connection with said main drive motor transmitting intermittent motion thereto, a cooling compartment adjacent said side frames having a width comparable to the distance between the outside faces of said side frames, and a height substantially less than that of said side frames, a conveyor in said cooling compartment connected with said intermittent motion connection of said mandrel assembly, a breaker mechanism and a filler mechanism mounted above said cooling compartment, a conveyor mounted above said cooling compartment and also connected with said intermittent motion connection, an impervious top panel disposed in overlying relation with said cooling compartment and in underlying relation with said mechanisms, and a continuously driven main shaft connected with said main drive motor and extending to said breaker and filler mechanisms, said main shaft being disposed in overlying relation with said top panel.

3. In a container fabricating machine, the combination comprising a pair of side frames fixed in spaced apart relation with each other and having a mandrel assembly journaled therebetween, a blank magazine mounted above said side frames, a feeder unit and a loader unit both mounted on said side frames adjacent said magazine, a cooling compartment adjacent said side frames and having a width comparable to the distance between the outside faces of said side frames and a height substantially less than that of said side frames, a top panel on said cooling compartment, a conveyor mounted above said top panel and extending longitudinally thereof, a breaker mechanism and a filler mechanism mounted above said top panel and on one side of said conveyor, and a closer mechanism and a sealing and stapling mechanism also mounted above said top panel but on the opposite side of said conveyor.

4. In a machine for fabricating containers from flat folded blanks, a feeder unit adapted to withdraw flat folded blanks individually from a magazine and to erect each such blank into an open-ended tube, said feeder unit comprising, in combination, a pick-up head, vacuum cup devices mounted on said pick-up head, a warping plate mounted in close proximity to said pick-up head and movable bodily therewith, said warping plate having outturned marginal edges, said warping plate being situated so that the plane of its marginal edges is located farther from said pick-up head than the plane of the edges of said vacuum cups, said pick-up head being thereby adapted to create a transverse warp in the blank and thus to straighten the same longitudinally upon withdrawing a blank from the stack.

5. In a container fabricating machine, a feeder unit adapted to withdraw flat folded blanks individually from a magazine and to erect each such blank in an open-ended tube, said feeder unit comprising, in combination, a pick-up head, vacuum cup devices mounted on said pick-up head, a warping plate mounted in close proximity to said pick-up head and movable bodily therewith, said warping plate having out-turned marginal edges, said warping plate being positioned relative to said pick-up head so that the plane of its marginal edges is located farther from said pick-up head than the plane of the edges of said vacuum cups, power means for extending said pick-up head and said warping plate toward said magazine and thereby effecting contact between said vacuum cups and the foremost blank in the stack, and means for arresting the movement of said warping plate as said pick-up head approaches the limit of such extending movement whereby said vacuum cups are extended substantially beyond the plane of the marginal edges of said warping plate.

6. In a container fabricating machine, a feeder unit for withdrawing flat folded blanks individually from a magazine and erecting each such blank as an open-ended tube, said feeder unit comprising, in combination, a pick-up head, vacuum cup devices mounted on said pick-up head, a warping plate mounted in close proximity to said pick-up head and movable bodily therewith, said warping plate having out-turned marginal edges, said warping plate being positioned relative to said pick-up head so that the plane of its marginal edges is located farther from said pick-up head than the plane of the edges of said vacuum cups, resilient means interposed between said warping plate and said pick-up head normally maintaining the warping plate in such position, a fluid actuator connected to said pick-up head and said warping plate for extending them toward the magazine and thereby effecting contact between said vacuum cups and the foremost blank in the stack, and means for arresting the movement of said warping plate as said pick-up head approaches the limit of such extending movement whereby said vacuum cups are extended substantially beyond the plane of the marginal edges of said warping plate and said resilient means is subjected to compression.

7. In a container fabricating machine, a feeder unit for withdrawing flat folded blanks individually from a magazine and erecting each such blank as an open-ended tube, said feeder unit comprising, in combination, a pick-up head adapted for extending and retracting movement with respect to the magazine, suction devices mounted on said pick-up head, a warping plate of substantially channel-shaped cross section mounted in close proximity to said pick-up head and movable bodily therewith, said warping plate being situated with the plane of its marginal edges located farther from said pick-up head than the plane of said suction devices, means for reciprocating said pick-up head to extend the same toward the magazine and to retract said pick-up head after it has withdrawn a blank, and an oscillating gate connected to said pick-up head for movement in timed relation therewith, said gate being disposed to exert a diagonal compression force on the blank during retraction of said pick-up head whereby the blank becomes squared.

8. In a machine for fabricating containers from flat folded blanks and having means for erecting such blanks and applying a moistureproof coating thereto, a cooling compartment comprising, in combination, a conveyor adapted to move a procession of erected and coated blanks in an orbital path, means defining a plenum chamber along the bottom of said compartment, said plenum chamber having air discharge apertures situated under said conveyor and the orbital path of said blanks, a plurality of blowers connected to discharge cooling air into said plenum chamber, and a cooling coil assembly situated between the suction side of said blowers and that portion of said compartment which houses said conveyor.

9. In a machine for fabricating containers from flat folded blanks and having means for erecting such blanks and applying a moistureproof coating thereto, a cooling compartment comprising, in combination, a wiper rail assembly, a water trough, and support rails, a conveyor adapted to move a procession of erected and coated blanks through said compartment and successively over said wiper rail assembly, said water trough and said support rails, means defining a plenum chamber extending along the bottom of said compartment beneath said conveyor, means defining in the top of said plenum chamber air discharge apertures situated under said conveyor, blower means having a discharge connected to said plenum chamber, a cooling coil assembly situated between the suction side of said blower means and that portion of said compartment which houses said conveyor, and a plurality of trays disposed in overlying relation with said conveyor, said trays being adapted to collect condensation and preclude it from falling into the erected blanks.

10. In a machine for fabricating containers, the combination comprising a side frame structure having a mandrel assembly journaled thereon, a blank magazine mounted on said side frame structure and defining a loading station, a feeder unit and a loader unit both mounted on said side frame structure in proximity to said magazine, a cooling compartment adjacent said side frame structure and substantially lower than the latter, a top panel on said cooling compartment, a conveyor mounted above said top panel and extending longitudinally thereof, a breaker mechanism and a filler mechanism mounted above said top panel on one side of said conveyor, and a closer mechanism and a sealing and stapling mechanism also mounted above said top panel but on the opposite side of said conveyor, said sealing and stapling mechanism defining a discharge station situated in close proximity to said loading station.

11. In a machine for fabricating containers from flat folded blanks, each such blank having major and minor bottom flaps, said machine also having a feeder unit for squaring each said blank and a mandrel assembly for receiving the same, a loader unit for transferring said blank to a mandrel and comprising, in combination, a movable head disposed for reciprocating movement longitudinally of the mandrel, a loading paddle pivotally mounted thereon, means for biasing said loading paddle at an angle whereby one of the minor flaps of the blank is folded in as an incident to transfer to the mandrel, and a pair of outwardly extending ears on said loading paddle for spreading the major flaps of said blank outwardly as an incident to transfer to said mandrel.

References Cited in the file of this patent

UNITED STATES PATENTS

| | | |
|---|---|---|
| 1,746,835 | Jones | Feb. 11, 1930 |
| 1,893,169 | Hartmann | Jan. 3, 1933 |
| 2,060,930 | Ellocott | Nov. 17, 1936 |
| 2,221,435 | Preston et al. | Nov. 12, 1940 |
| 2,357,535 | Monroe | Sept. 5, 1944 |
| 2,367,884 | Monroe | Jan. 23, 1945 |
| 2,370,745 | Monroe | Mar. 6, 1945 |
| 2,583,106 | Kayat | Jan. 22, 1952 |
| 2,750,721 | Earp et al. | June 19, 1956 |
| 2,788,031 | Martin | Apr. 9, 1957 |